(12) United States Patent
Mepham et al.

(10) Patent No.: US 12,372,144 B1
(45) Date of Patent: Jul. 29, 2025

(54) ELECTRIFIED AXLE

(71) Applicant: Allison Transmission, Inc., Indianapolis, IN (US)

(72) Inventors: Shaun Mepham, Clarkston, MI (US); Christopher G. Baillie, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/733,169

(22) Filed: Jun. 4, 2024

(51) Int. Cl.
| | |
|---|---|
| *F16H 37/08* | (2006.01) |
| *B60K 1/02* | (2006.01) |
| *F16H 57/021* | (2012.01) |
| *F16H 57/04* | (2010.01) |
| *F16H 61/04* | (2006.01) |
| *F16H 57/02* | (2012.01) |

(52) U.S. Cl.
CPC ............ *F16H 37/082* (2013.01); *B60K 1/02* (2013.01); *F16H 57/021* (2013.01); *F16H 57/04* (2013.01); *F16H 57/0471* (2013.01); *F16H 57/0473* (2013.01); *F16H 57/0483* (2013.01); *F16H 61/0403* (2013.01); *F16H 2057/02034* (2013.01); *F16H 2057/02052* (2013.01); *F16H 2200/0021* (2013.01)

(58) Field of Classification Search
CPC . B60K 1/02; B60K 2007/0061; F16H 57/021; F16H 57/04; F16H 57/0471; F16H 57/0473; F16H 57/0483; F16H 2057/02034; F16H 2057/02052; F16H 61/0403; F16H 2200/0021
See application file for complete search history.

(56) References Cited

U.S. PATENT DOCUMENTS

| | | | |
|---|---|---|---|
| 10,851,881 | B2 | 12/2020 | Duan et al. |
| 11,441,652 | B2 | 9/2022 | Engerman |
| 11,623,510 | B2 | 4/2023 | Engerman |

(Continued)

FOREIGN PATENT DOCUMENTS

| | | |
|---|---|---|
| CN | 202156293 U | 3/2012 |
| DE | 102021206522 A1 | 12/2022 |

(Continued)

*Primary Examiner* — Farhana Pervin
(74) *Attorney, Agent, or Firm* — Faegre Drinker Biddle & Reath LLP

(57) ABSTRACT

A driveline assembly comprises a power source and an output operably coupled to the power source. Further, a transmission assembly comprises an intermediate shaft comprising a first power transmission component and a second power transmission component and the intermediate shaft is operably coupled to the power source. An output assembly comprises a drive member coupled to the output, a planetary gearset operably coupled to the drive member and a third power transmission component coupled between the first power transmission component and the planetary gearset. Further, the output assembly comprises a fourth power transmission component coupled between the second power transmission component and the drive member independent of the planetary gearset, both the third power transmission component and the fourth power transmission component are selectively coupled to the power source to drive the output.

18 Claims, 19 Drawing Sheets

(56) References Cited

U.S. PATENT DOCUMENTS

| | | | | |
|---|---|---|---|---|
| 2008/0047799 | A1* | 2/2008 | Combes | F16D 48/02 |
| | | | | 192/58.5 |
| 2009/0250278 | A1* | 10/2009 | Kawasaki | B60K 6/543 |
| | | | | 903/910 |
| 2011/0312460 | A1* | 12/2011 | Nett | B60W 10/08 |
| | | | | 475/5 |
| 2014/0373524 | A1* | 12/2014 | Schuller | F15B 15/202 |
| | | | | 60/429 |
| 2019/0219154 | A1* | 7/2019 | Leiber | F16D 25/12 |
| 2022/0045577 | A1 | 2/2022 | Baillie et al. | |
| 2022/0297520 | A1 | 9/2022 | Mepham et al. | |
| 2024/0026967 | A1* | 1/2024 | Takeuchi | F16H 57/0436 |
| 2024/0068560 | A1* | 2/2024 | Irato | F16H 61/30 |

FOREIGN PATENT DOCUMENTS

| | | | |
|---|---|---|---|
| DE | 102022206875 A1 * | 1/2024 | |
| JP | 2019143789 A | 8/2019 | |
| WO | 2013007886 A1 | 1/2013 | |
| WO | 2022037911 A1 | 2/2022 | |

\* cited by examiner

ELECTRIFIED AXLE

FIELD OF THE DISCLOSURE

The present disclosure relates to an electric powertrain assembly for an axle of a vehicle.

BACKGROUND OF THE DISCLOSURE

Electrified axles provide more powertrain assemblies for powering axles on a vehicle. Compact and efficient electrified axles may include one or more power transmission paths that a user may shift between to accommodate varied desired torque and speed levels.

SUMMARY OF THE DISCLOSURE

In one embodiment of the present disclosure, a driveline assembly is provided. The driveline assembly comprises a power source, an output operably coupled to the power source and a transmission assembly. The transmission assembly comprises an intermediate shaft comprising a first power transmission component and a second power transmission component, the intermediate shaft operably coupled to the power source. The transmission assembly further comprises an output assembly comprises a drive member coupled to the output, a planetary gearset operably coupled to the drive member and a third power transmission component coupled between the first power transmission component and the planetary gearset. Further, a fourth power transmission component is coupled between the second power transmission component and the drive member independent of the planetary gearset and both the third power transmission component and the fourth power transmission component are selectively coupled to the power source to drive the output.

In embodiments, the drive member is a differential.

In embodiments, the differential comprises a differential input and the fourth power transmission component is coupled to the differential input to rotate the differential.

In embodiments, the intermediate shaft comprises a fifth power transmission component and the output assembly comprises a sixth power transmission component operably coupled to the fifth power transmission component. Further, a first synchronizer is selectively coupled between the first power transmission component and the fifth power transmission component.

In embodiments, the sixth power transmission component is operably coupled between the fifth power transmission component and the planetary gearset.

In embodiments, the intermediate shaft is a first intermediate shaft and the driveline assembly further comprises a second intermediate shaft. Further, the third power transmission component and the sixth power transmission component are coupled to the second intermediate shaft.

In embodiments, the at least one of the third power transmission and the sixth power transmission component are coupled to the second intermediate shaft.

In embodiments, the intermediate shaft comprises a seventh power transmission component and the output assembly comprises an eighth power transmission component operably coupled to the seventh power transmission component. Further, a second synchronizer is selectively coupled between the second power transmission component and the seventh power transmission component.

In embodiments, each of an output shaft of the power source, the intermediate shaft and the output shaft of the output assembly are substantially parallel to each other and substantially perpendicular to a longitudinal centerline of the driveline assembly.

In embodiments, the output shaft of the power source is forward of the intermediate shaft and the intermediate shaft is forward of the output shaft of the output assembly.

In embodiments, each of the power source, the intermediate shaft and the output assembly are positioned within a driveline housing.

In embodiments, a driveline assembly is provided. The driveline assembly comprises a power source operably coupled to a power source output. The driveline assembly further comprises an intermediate shaft comprising an intermediate shaft input and a plurality of intermediate shaft outputs. Further, the intermediate shaft input is operably coupled to the power source output. An output assembly comprises a plurality of output assembly inputs operably coupled to the plurality of intermediate shaft outputs and the output assembly includes an output assembly output. Further, each of the power source output, the intermediate shaft, and the output assembly output are substantially parallel to each other and substantially perpendicular to a longitudinal centerline of the driveline assembly.

In embodiments, the intermediate shaft is positioned longitudinally intermediate the power source and the output assembly.

In embodiments, each of the power source, the intermediate shaft and the output assembly are positioned within a driveline housing.

In embodiments, the plurality of intermediate shaft outputs includes a first intermediate shaft output and a second intermediate shaft output. Further, the plurality of output assembly inputs comprises a first output assembly input and a second output assembly input, and the first output assembly input is coupled to the first intermediate shaft output and the second output assembly input is coupled to the second intermediate shaft output.

In embodiments, the output assembly includes a planetary gearset operably coupled to a differential. Further, the first output assembly input is drivingly coupled to the differential through the planetary gearset and the second output assembly input is drivingly coupled to the differential independent of the planetary gearset.

In embodiments, the differential further includes a casing and the second output assembly input is operably coupled to the casing to rotate the differential.

In embodiments, the intermediate shaft further comprises a third intermediate shaft output. Further, a synchronizer is selectively coupleable between the first intermediate shaft output and third intermediate shaft output.

In embodiments, the output assembly includes a third output assembly input operably coupled to the third intermediate shaft output. Further, the third output assembly input is drivingly coupled to the differential through the planetary gearset.

In embodiments, the intermediate shaft further comprises a fourth intermediate shaft output and the output assembly comprises a fourth output assembly input operably coupled to the fourth intermediate shaft output. Further, the fourth output assembly input is operably coupled to the differential independent of the planetary gearset.

In embodiments, a first power transmission path is defined by the first intermediate shaft output, the first output assembly input, and the planetary gearset. Further, a second power transmission path is defined by the second intermediate shaft output and the second output assembly input. Further, the first power transmission path has a lower gear ratio than the second power transmission path.

In embodiments, the intermediate shaft has an intermediate shaft width, and the power source has a power source width, and the power source width is between 50-150% of the intermediate shaft width.

In yet another embodiment of the present disclosure, a driveline assembly is provided. The driveline assembly comprises a power source operably coupled to a first power source output and a second power source output. A first intermediate shaft comprises a first intermediate shaft input and a first intermediate shaft output, and the first intermediate shaft input is operably coupled to the first power source output. Further, a second intermediate shaft comprises a second intermediate shaft input and a second intermediate shaft output, and the second intermediate shaft input is operably coupled to the second power source output. An output assembly comprises a plurality of output assembly inputs operably coupled to the first intermediate shaft output and the second intermediate shaft output, the output assembly having an output assembly output. Further, at least a portion of the first intermediate shaft is positioned vertically above the second intermediate shaft.

In embodiments, the output assembly comprises a planetary gearset operably coupled to a differential, and the plurality of output assembly inputs includes a first output assembly input and a second output assembly input. Further, the first intermediate shaft output is coupled to the differential through the planetary gearset and the first output assembly input. Further, the second intermediate shaft output is coupled to the differential through the second output assembly input and independent of the planetary gearset.

In embodiments, the first intermediate shaft includes the first intermediate shaft output and a third intermediate shaft output and the second intermediate shaft includes the second intermediate shaft output and a fourth intermediate shaft output.

In embodiments, the first intermediate shaft includes a first clutch configured to selectively couple the first intermediate shaft with the first power source output.

In embodiments, the second intermediate shaft includes a second clutch configured to selectively couple the second intermediate shaft with the second power source output.

In embodiments, the driveline assembly further includes a housing and each of the power source, first intermediate shaft, second intermediate shaft, and output assembly are positioned within the housing.

In embodiments, the housing is split along a longitudinal axis.

In yet another embodiment of the present disclosure, a driveline assembly is provided. The driveline assembly includes a power source operably coupled to a first power source output and a second power source output. Further, a first intermediate shaft assembly operably coupled to the first power source output, the first intermediate shaft assembly comprises a first shaft, a first output gear, and a first clutch operably coupled to the first shaft. Further, the first clutch is operable between a disengaged position wherein the power source is operably decoupled from the first output gear and an engaged position wherein the power source is operably coupled to the first output gear. A second intermediate shaft assembly is operably coupled to the second power source output, and the second intermediate shaft assembly comprises a second shaft, a second output gear, and a second clutch operably coupled to the second shaft. Further, the second clutch is operable between a disengaged position wherein the power source is operably decoupled from the second output gear and an engaged position wherein the power source is operably coupled to the second output gear. Further, an output assembly is selectively coupled with one of the first intermediate shaft assembly and the second intermediate shaft assembly. The driveline assembly further comprises a hydraulic assembly comprising a pump, a first valve operably coupled to the first clutch, the first valve operable to actuate a first piston to alter the first clutch between the disengaged and engaged position. Further, a second valve operably coupled to the second clutch, the second valve operable to actuate a second piston to alter the second clutch between the disengaged and engaged position. Further, an accumulator fluidly coupled to the pump, the first valve, and the second valve.

In embodiments, the driveline assembly further comprises a third valve operably coupled to a first synchronizer, a fourth valve operably coupled to a second synchronizer, and the accumulator fluidly coupled to the pump, the first valve, the second valve, the third valve, and the fourth valve.

In embodiments, the first synchronizer is coupled to the first intermediate shaft assembly and the second synchronizer is coupled to the second intermediate shaft assembly.

In embodiments, the driveline assembly further comprises a fifth valve operably coupled to the first synchronizer, a sixth valve operably coupled to the second synchronizer, and the accumulator fluidly coupled to the pump, the first valve, the second valve, the third valve, the fourth valve, the fifth valve, and the sixth valve.

In embodiments, the first intermediate shaft assembly includes the first output gear and a third output gear, and the third valve is operable to couple the first synchronizer with the first output gear and the fifth valve is operable to couple the first synchronizer with the third output gear. Further, the second intermediate shaft assembly includes the second output gear and a fourth output gear, and the fourth valve is operable to couple the second synchronizer with the second output gear and the sixth valve is operable to couple the second synchronizer with the fourth output gear.

In embodiments, the accumulator is operable to maintain a pressure at each of the first valve, second valve, third valve, fourth valve, fifth valve, and sixth valve.

In embodiments, the driveline assembly further comprises a cooling assembly comprising a pump and a cooling assembly valve selectively fluidly coupled to each of the first clutch and the second clutch. Further, a controller is operably coupled to the cooling assembly valve and the controller is operable to selectively control cooling fluid flowing to each of the first clutch and the second clutch.

In embodiments, the cooling assembly is fluidly coupled to a cooling load separate from the first clutch and the second clutch.

In embodiments, the cooling load is at least one of a bearing, bushing, gear, and chain.

In yet another embodiment of the present disclosure, a driveline assembly is provided. The driveline assembly comprises a power source comprising a power source output extending generally laterally along a first axis. Further, the driveline assembly includes an output assembly comprising a planetary gearset comprising a planetary gearset input. Further, the planetary gearset is rotatable about a second axis parallel to the first axis and a differential is operably coupled to the planetary gearset. Further, an output assembly input member is operably coupled to the planetary gearset input and an output member is coupled to the differential and the output member extends generally laterally and an endless member is coupled between the power source output and the output assembly input member.

In embodiments, the output assembly input member is a portion of an intermediate shaft, and the output member extends through the intermediate shaft.

In embodiments, the endless member is a chain.

In embodiments, a planet carrier of the planetary gearset is operably coupled to an input of the differential.

In embodiments, the planetary gearset is positioned laterally intermediate the output assembly input member and the differential.

In yet another embodiment of the present disclosure, a driveline assembly is provided. The driveline assembly comprises a power source including a power source output extending generally laterally along a first axis. Further, an output assembly comprises a housing, an output assembly input coupled to an outer surface of the housing, an output operably coupled to the output assembly input, and an output shaft operably coupled to the output. Further, the output shaft extends generally laterally and the power source is coupled to the output assembly by at least one endless member.

In embodiments, the intermediate shaft assembly comprises an intermediate shaft input and an intermediate shaft output, and the intermediate shaft input is coupled to the power source output and the intermediate shaft output is coupled to the output assembly input.

In embodiments, the at least one endless member includes a first endless member coupled between the intermediate shaft input and the power source output and a second endless member coupled between the intermediate shaft output and the output assembly input. In embodiments, the output assembly input is integral with the housing.

In embodiments, the driveline assembly is positioned within a housing.

In embodiments, the intermediate shaft assembly extends laterally along a second axis and the housing rotates about a third axis. Further, each of the first axis, the second axis, and the third axis are substantially parallel.

DETAILED DESCRIPTION OF THE DRAWINGS

Figure 1:
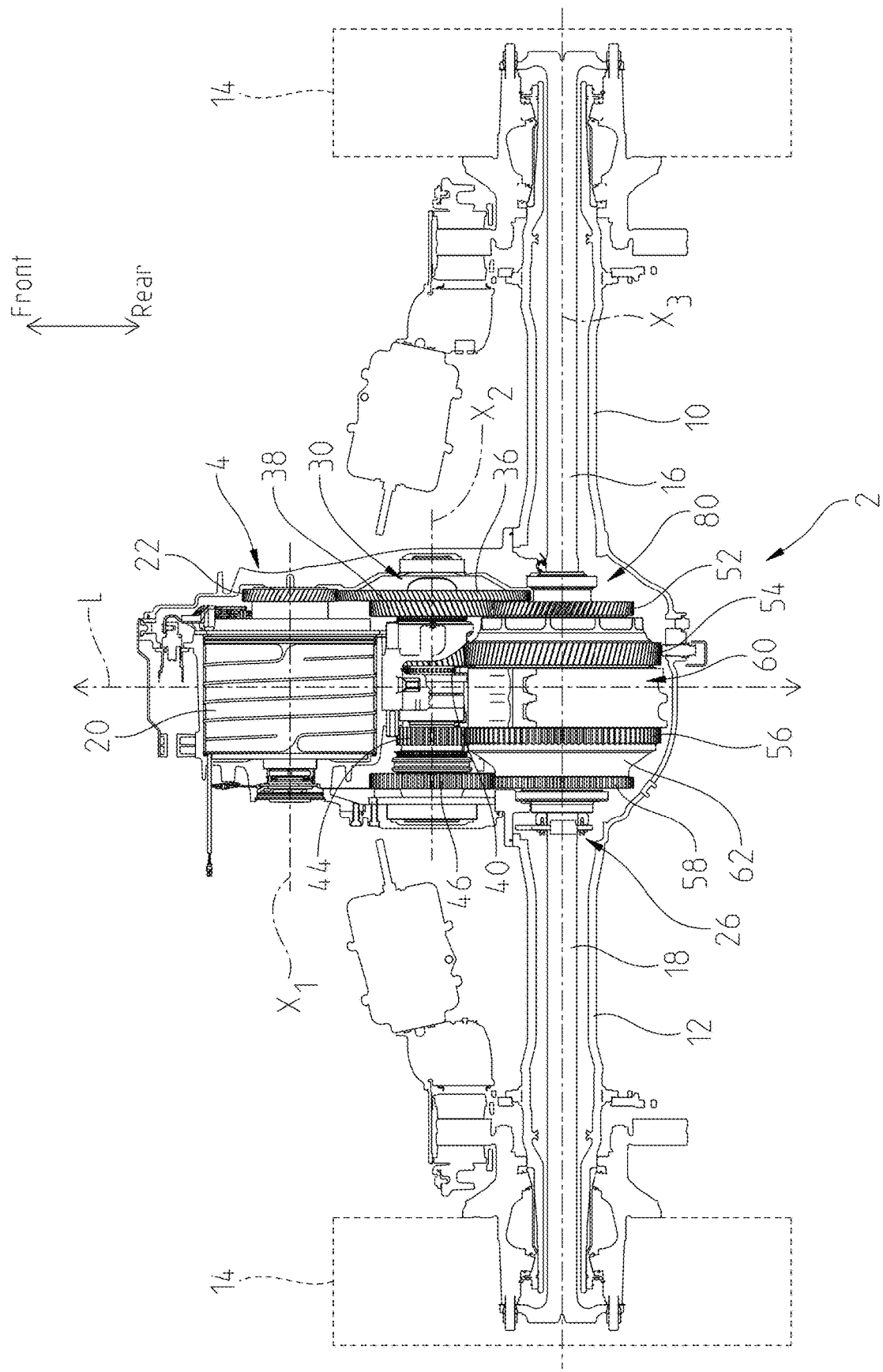
FIG. 1 is a top-down cutaway view of an axle assembly of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

With reference to the Figures, wherein like numerals indicate like parts throughout the several views, the present invention includes an axle assembly 2 for use with a vehicle such as for example, a body-on-frame truck. In the embodiment shown, ground engaging members 14 are arranged at opposing ends of the axle assembly 2 to support the vehicle for conveyance along a ground surface. The axle assembly 2 propels the vehicle by transferring motive power to the wheels for rotation along the ground. In various embodiments, ground engaging members 14 are wheels. In embodiments, axle assembly 2 is configured to provide one or more discrete power transmission paths to ground engaging members 14 which may each have a discrete gear ratio. In embodiments, the axle assembly 2 may be configured as a front axle assembly, a rear axle assembly, or a mid-axle assembly. In embodiments, a vehicle may include one or more axle assemblies 2.

Figure 2:
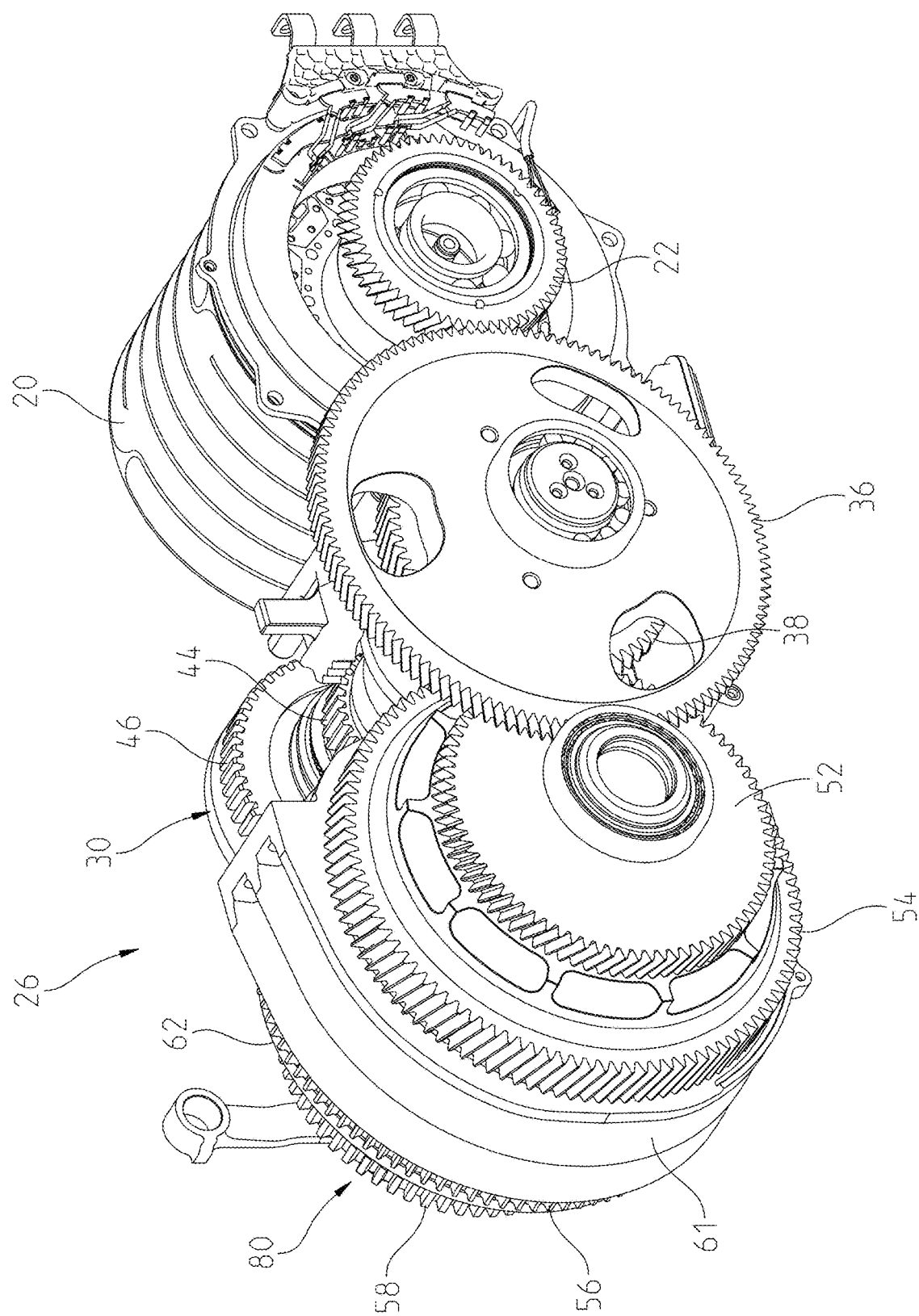
FIG. 2 is a perspective view of a portion of the axle assembly of FIG. 1.
Figure 3:
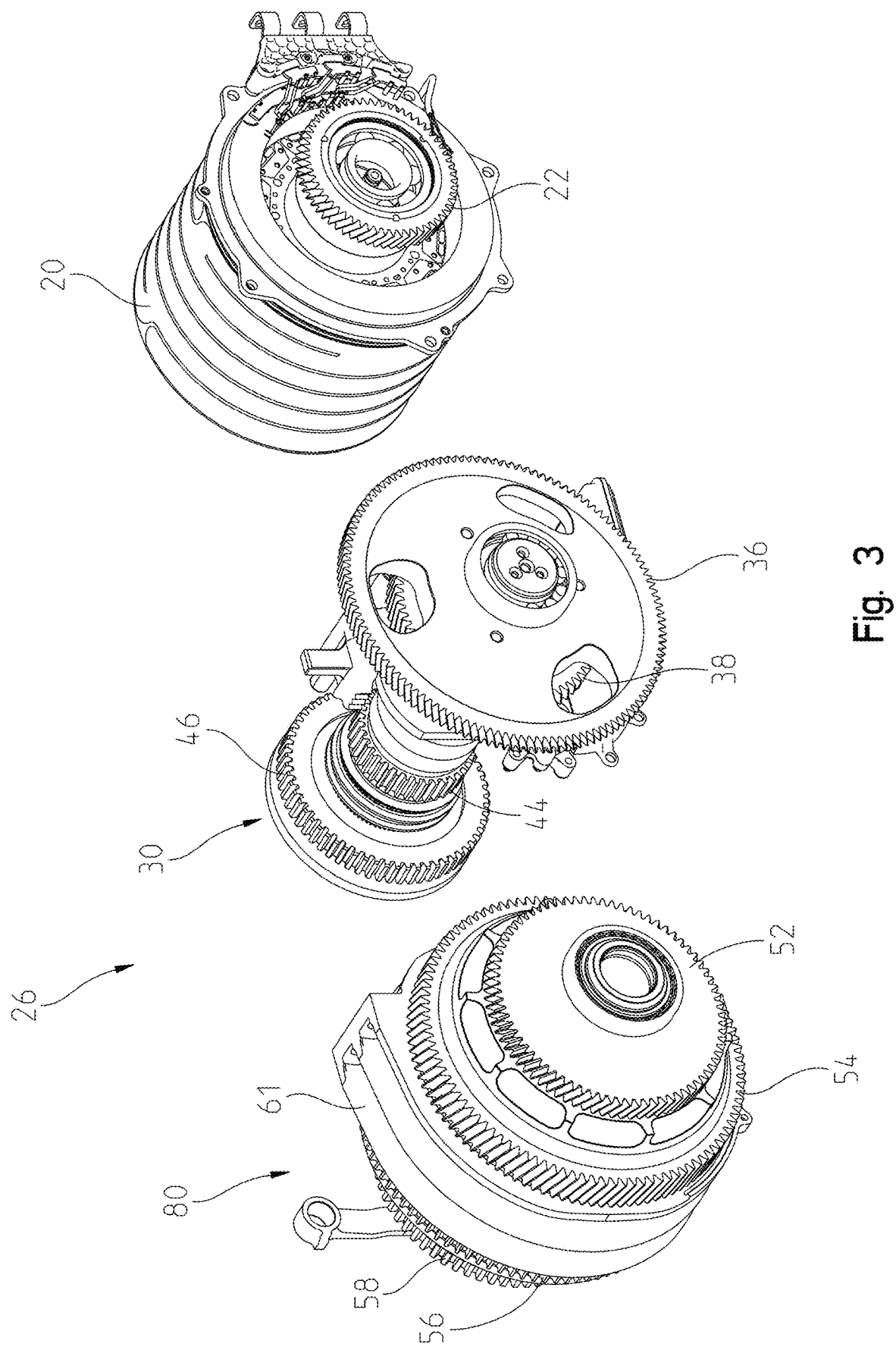
FIG. 3 is an exploded view of the portion of the axle assembly of FIG. 2.

Referring now to FIGS. 1-3, axle assembly 2 comprises a housing 4 generally extending along a longitudinal axis L. An electric motor or power source 20 and a transmission assembly 26 including an intermediate shaft assembly 30, and an output assembly 80 are each positioned within housing 4. Housing 4 may be comprised of a one or more individual pieces or members. In embodiments, housing 4 includes a longitudinal split line to split the housing into one or more individual pieces. In embodiments, the longitudinal split line extends along either lateral side of housing 4 and there is a top piece and a bottom portion of the housing. In embodiments, the longitudinal split line extends along either top and bottom side of housing 4 and there is a left and a right portion of the housing. In embodiments, the longitudinal split line extends along an axis parallel to the longitudinal axis L. Electric motor 20 is positioned longitudinally forward of each of intermediate shaft assembly 30 and output assembly 80, and intermediate shaft assembly 30 is positioned longitudinally forward of output assembly 80. Further, intermediate shaft assembly 30 is coupled intermediate electric motor 20 and output assembly 80, and a first output shaft 16 is operably coupled between output assembly 80 and a first ground engaging member 14 (e.g., a right ground engaging member) and a second output shaft 18 is operably coupled between output assembly 80 and a second ground engaging member 14 (e.g., a left ground engaging member). In embodiments, a first shaft housing 10 is coupled to housing 4 and generally surrounds first output shaft 16 and a second shaft housing 12 is coupled to housing 4 and generally surrounds second output shaft 18. Illustratively, electric motor 20 is configured to rotate about a first axis X1, intermediate shaft assembly 30 is configured to rotate about a second axis X2, and each of output assembly 80, first output shaft 16, and second output shaft 18 are configured to rotate about a third axis X3.

Referring still to FIG. 1-3, electric motor 20 is operably coupled to an output gear 22, or power transmission component 22 which rotates along first axis X1 along with electric motor 20. Intermediate shaft assembly 30 may be operably coupled to housing 4 and includes a shaft 32 configured to rotate within housing 4 and a plurality of power transmission components including an input gear 36 coupled to shaft 32, and a first output gear 40, a second output gear 38, a third output gear 44, and a fourth output gear 46 selectively coupled to shaft 32. That is, shaft 32 and input gear 36 rotate at the same speed, while each of first output gear 40, second output gear 38, third output gear 44, and fourth output gear 46 are selectively coupled to shaft 32 to rotate with shaft 32.

Referring to FIGS. 4-7, a first synchronizer 42 is positioned intermediate first output gear 40 and second output gear 38 and a second synchronizer 48 is positioned intermediate third output gear 44 and fourth output gear 46. First synchronizer 42 is coupled to intermediate shaft 32 and configured to translate between a plurality of positions wherein in a first position the first synchronizer is coupled with first output gear 40, in a second position the first synchronizer 42 is coupled with second output gear 38, and in a third position the first synchronizer 42 is in a neutral position and is not coupled to either of first output gear 40 and second output gear 38. Second synchronizer 48 is coupled to intermediate shaft 32 and configured to translate between a plurality of positions wherein in a first position the second synchronizer is coupled with third output gear 44, in a second position the first synchronizer 42 is coupled with fourth output gear 46, and in a third position the second synchronizer 48 is in a neutral position and is not coupled to either of third output gear 44 and fourth output gear 46.

Output assembly 80 comprises a geartrain 82 and a differential or drive member 60. Geartrain 82 comprises a shaft 50 and a plurality of power transmission components including a first input gear 54 operably coupled to shaft 50, a second input gear 52 operably coupled to shaft 50, a third input gear 56, and a fourth input gear 58. In embodiments, shaft 50, first input gear 54 and second input gear 52 are integral. In embodiments, shaft 50 is an intermediate shaft and surrounds first output shaft 16. Illustratively, first output gear 40 is configured to be selectively operably coupled to first input gear 54, second output gear 38 is configured to be selectively operably coupled to second input gear 52, third output gear 44 is configured to be selectively operably coupled to third input gear 56, and fourth output gear 46 is configured to be selectively operably coupled to third input gear 56. In embodiments, the first gear mesh between first output gear 40 and first input gear 54 is a first gear ratio, the second gear mesh between second output gear 38 and second input gear 52 is a second gear ratio, the third gear mesh between third output gear 44 and third input gear 56 is a third gear ratio, and the fourth gear mesh between fourth output gear 46 and fourth input gear 58 is a fourth gear ratio.

Referring to FIGS. 1-7, differential 60 of output assembly 80 includes an outer casing 62. In embodiments, each of third input gear 56 and fourth input gear 58 are coupled to an outer surface of outer casing 62. In embodiments, each of third input gear 56, fourth input gear 58 and outer casing 62 are integral. That is, as either of third input gear 56 or fourth input gear 58 are rotated, outer casing 62 is also rotated. Differential 60 includes an inner gear train 71 operably coupled between outer casing 62 and each of first output shaft 16 and second output shaft 18 and differential 60 is configured to transfer power to ground engaging members 14 through first output shaft 16 and second output shaft 18.

A planetary gearset 64 is coupled between shaft 50 and inner gear train 71. Shaft 50 includes a geared end 68 configured to operate as the sun gear of planetary gearset 64.

Planetary gearset 64 includes a ring gear 66 and a plurality of planet gears 70 coupled between ring gear 66 and geared end 68, or sun gear 68. A planet carrier 69 is configured to carry each of planet gears 70 and planet carrier 69 is configured to transfer power to inner gear train 71 and to first output shaft 16 and second output shaft 18.

Figure 8:
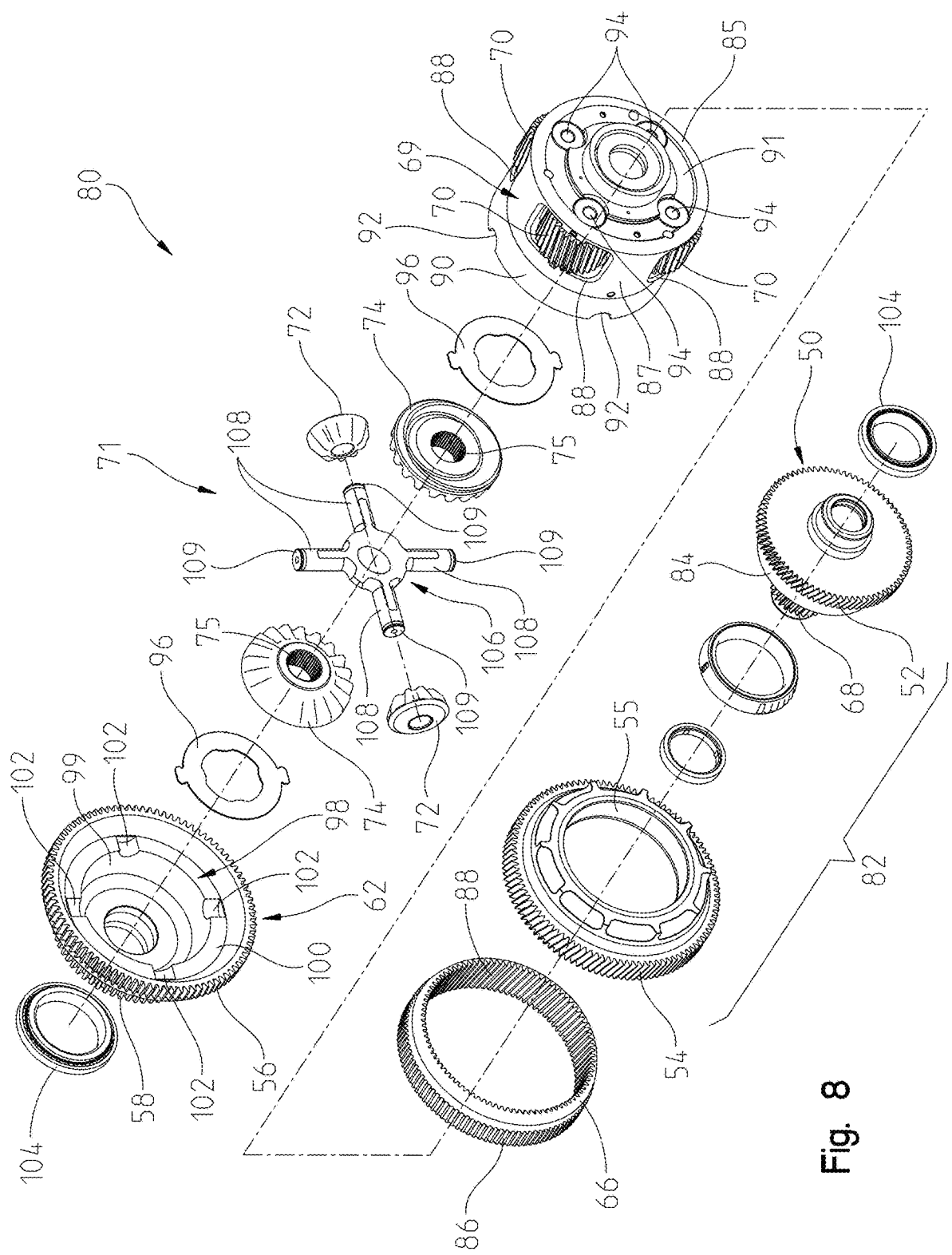
FIG. 8 is an exploded view of an output assembly of the axle assembly of FIG. 1.

Referring to FIG. 8, shaft 50 of output assembly 80 includes a shoulder 84 positioned adjacent second input gear 52 and first input gear 54 is coupled to shoulder 84. That is, first input gear 54 comprises an inner annulus 55 configured to couple to shoulder 84. In embodiments, first input gear 54 is integral with shaft 50. Ring gear 66 includes an outer facing gear mesh 86 and an inner facing gear mesh 88. An outer mount 61 includes an inner facing gear mesh 63 configured to interface with outer facing gear mesh 86 of ring gear 66. That is, ring gear 66 is effectively mated to, and coupled to, the inner surface of outer mount 61. Planet carrier 69 includes a generally cylindrical case 85 with a base 91 and an annular side wall 87 including a plurality of openings 89, or windows 89, and an annular extension 90 extending from the annular side wall 87. The annular extension 90 defines a plurality of scallops 92 spaced about the circumference of the annular extension 90. Base 91 defines a plurality of apertures 94 configured to receive a pin (not shown) along a pin axis (not shown). Planet gears 70 are configured to rotate about the pin (not shown) about the pin axis (not shown) and a portion of each planet gear 70 is configured to extend through window 89, respectively. Planet carrier 69 is configured to sit radially within ring gear 66 such that each planet gear 70 is meshedly engaged with inner facing gear mesh 88. That is, planet gears 70 are meshedly coupled intermediate the sun gear 68 and inner facing gear mesh 88 of ring gear 66.

Output assembly 80 includes outer casing 62 which includes third input gear 56 and fourth input gear 58 and an inner surface 98. A shoulder 100 is positioned along inner surface 98 and is generally annular and extends circumferentially about the inner surface of outer casing 62. Shoulder 100 defines a plurality of scallops 102 which are spaced about the circumference of shoulder 100. Inner surface 98 defines a recessed portion 99 adjacent shoulder 100.

Figure 7:
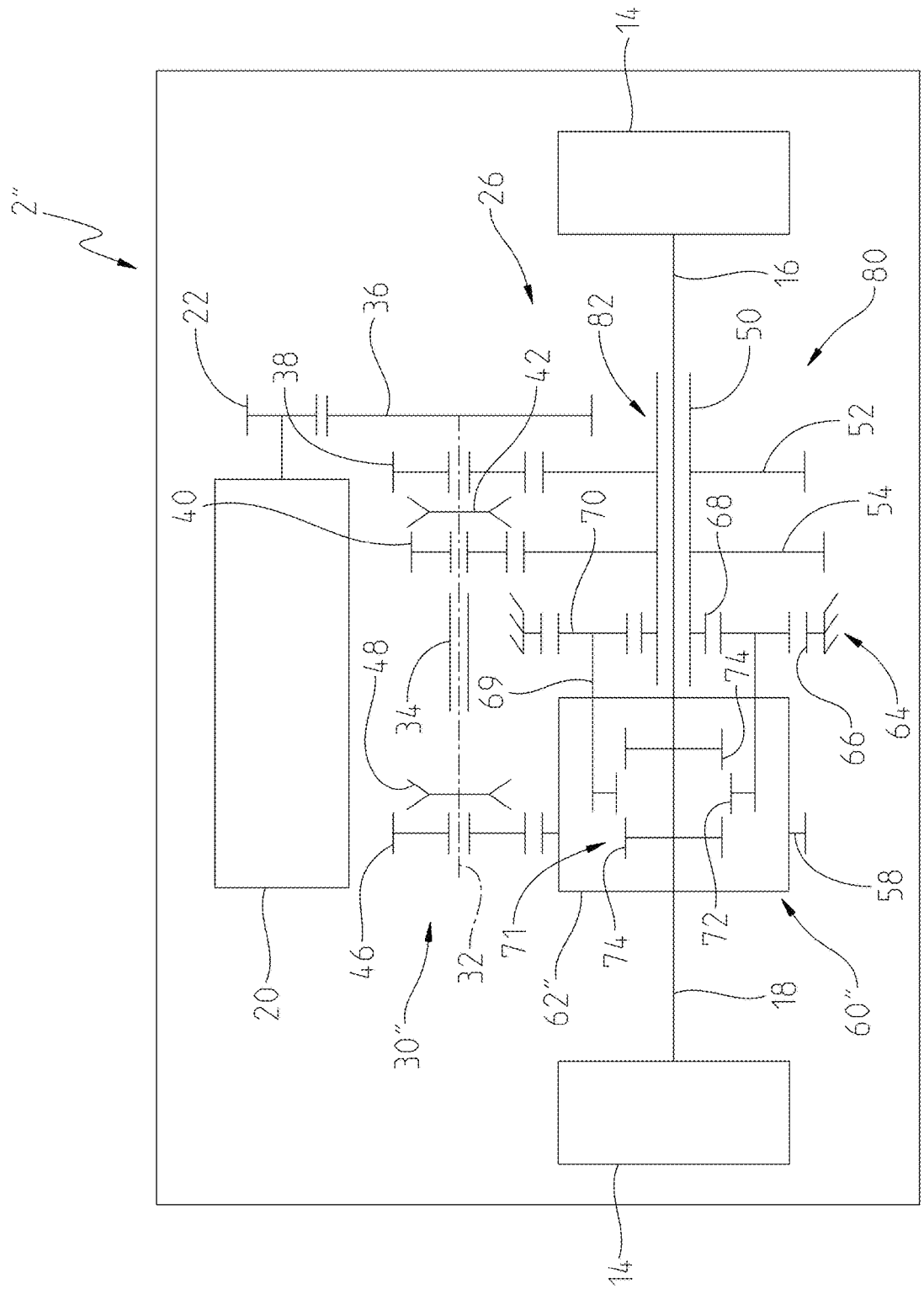
FIG. 7 is a stick diagram of an alternative axle assembly of the present disclosure.

Still referring to FIG. 8, gear train 71 generally includes a carrier 106, a pair of pinion gears 72, and a pair of output gears 74. Carrier 106 is generally an input to the differential 60 and includes four posts 108 which are generally perpendicular each other and each post 108 includes a top portion 109 positioned at a radial extent. Each pinion gear 72 of the pair of pinion gears 72 is disposed on one post 108 of the four posts and the pair of pinion gears 72 are positioned opposite one another. Each pinion gear 72 is configured to sit at the base of the respective post 108 and the top portion 109 extends past pinion gear 72 (FIG. 7). Illustratively, as best shown in FIG. 7, each output gear 74 is configured to extend between the pair of pinion gears 72. Output gears 74 are configured to sit within recessed portion 99 of outer casing 62 and a recessed portion (not shown) of planet carrier 69. Further, carrier 106 and pinion gears 72 are positioned intermediate outer casing 62 and planet carrier 69. That is, the annular extension 90 of planet carrier 69 may engage, or approach, shoulder 100 of outer casing 62, and posts 108 are configured to sit within scallops 92 of annular extension 90 and scallops 102 of shoulder 100. Output gears 74 are meshedly engaged with pinion gears 72 of carrier 106 which is operably coupled to each of outer casing 62 and planet carrier 69. A rotational input to planet carrier 69 or outer casing 62 will rotate both carrier 106 and output gears 74. Further, gear train 71 includes a plurality of spacers 96, and a first spacer 96 is positioned between a first output gears 74 and the recess (not shown) within planet carrier 69 and a second spacer 96 is positioned between a second output gears 74 and the recessed portion 99 of outer casing 62. Output assembly 80 also includes a plurality of bearings 104 configured to support output assembly components including differential 60 and geartrain 82.

Figure 4:
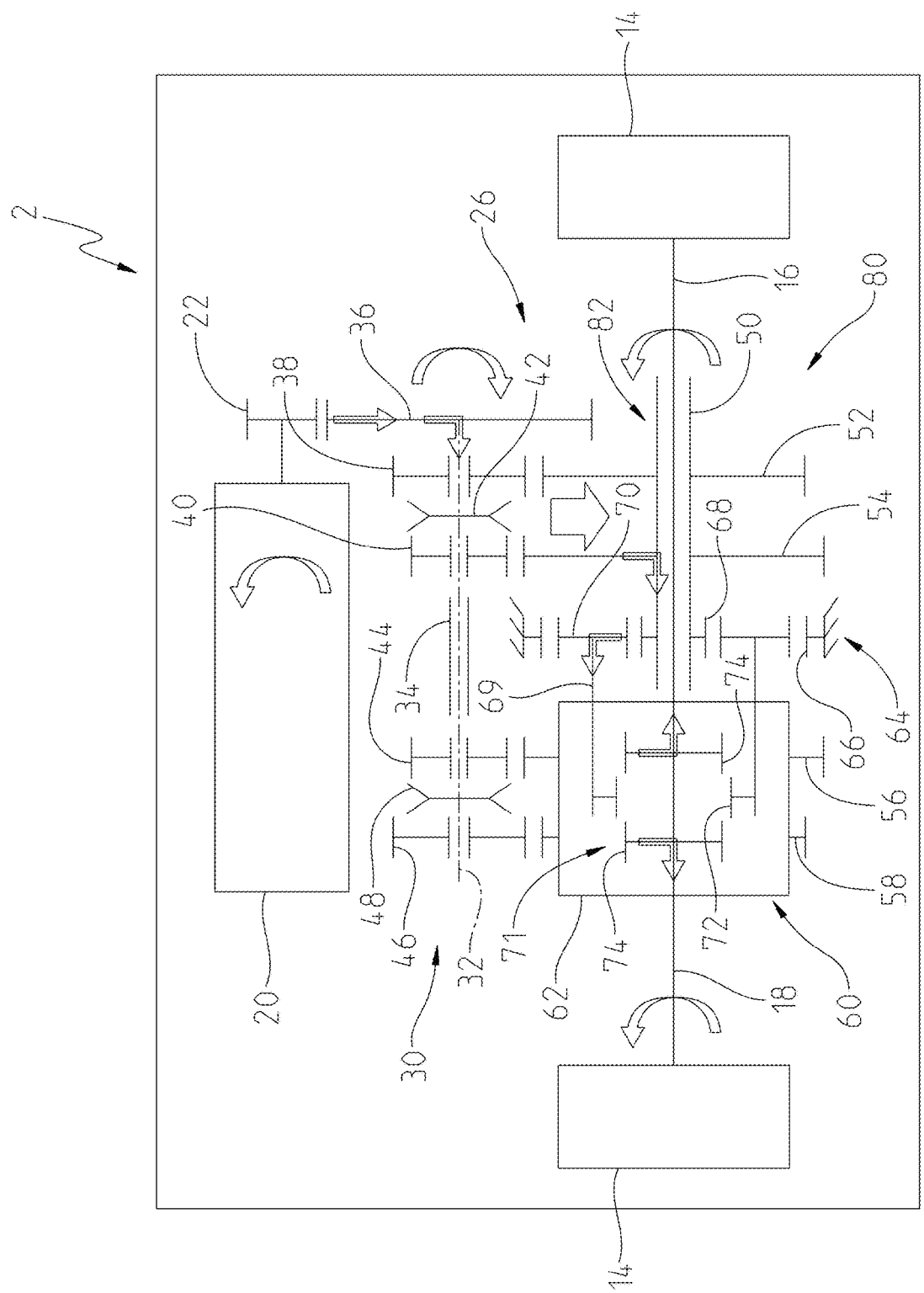
FIG. 4 is a stick diagram of a power transmission path of the axle assembly of FIG. 1.
Figure 5:
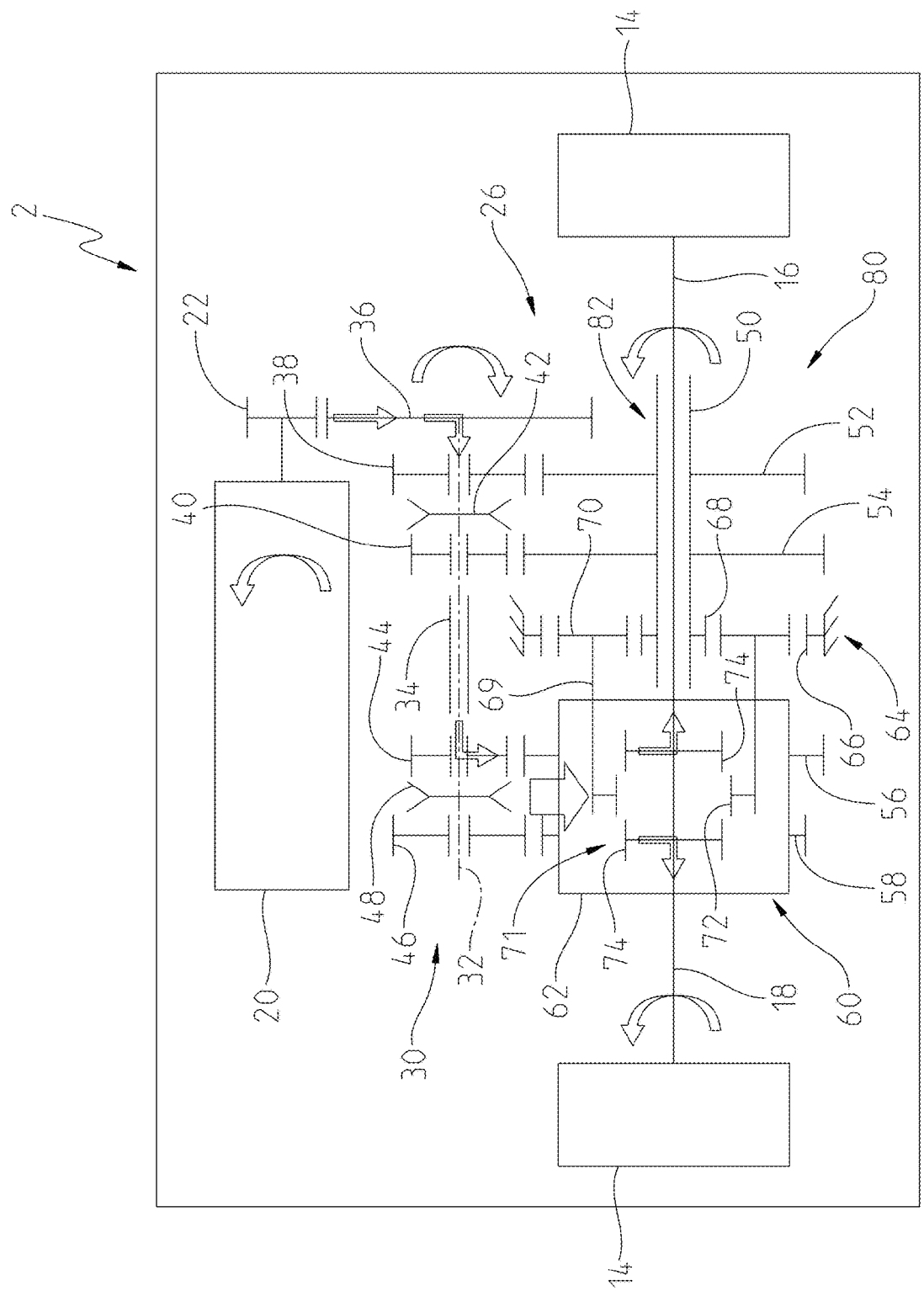
FIG. 5 is a stick diagram of an alternative power transmission path of the axle assembly of FIG. 1.

Referring now to FIGS. 4-5, axle assembly 2 comprises a plurality of discrete power transmission paths which may each provide discrete gear ratios between electric motor 20 and ground engaging members 14. Referring to FIG. 4, axle assembly 2 is providing power between motor 20 and ground engaging members 14 in a first gear through the first gear mesh including first output gear 40 and first input gear 54 defining a first power transmission path. That is, power is provided from electric motor 20 to rotate output gear 22 which is meshedly engaged with input gear 36. A rotation of input gear 36 rotates shaft 32 of intermediate shaft assembly 30. In the first gear, first synchronizer 42 engages first output gear 40 and rotates first output gear 40 with shaft 32. First output gear 40 is meshedly engaged with first input gear 54 and a rotation of first output gear 40 rotates first input gear 54. First input gear 54 is coupled to shaft 50 and a rotation of first input gear 54 rotates shaft 50 and geared end 68 of planetary gearset 64. An input to sun gear 68 of planetary gearset 64 rotates planet gears 70 between sun gear 68 and the fixed ring gear 66 which in turn rotates planet carrier 69 and a rotation of planet carrier 69 rotates carrier 106 which rotates output gears 74 to provide rotational power to first output shaft 16 and second output shaft 18. As planet carrier 69 rotates carrier 106, outer casing 62 is coupled to carrier 106 and is also rotated with planet carrier 69.

In embodiments, axle assembly 2 is configured to shift into a second gear ratio defining a second power transmission path. In the second gear ratio, first synchronizer is configured to engage second output gear 38 and power is transferred between second output gear 38 to second input gear 52 and on to planetary gearset 64. Power is then transferred through planetary gearset 64 to first output shaft 16 and second output shaft 18 as previously described.

In embodiments, in each of the first gear and the second gear, first synchronizer 42 is engaged with either of first output gear 40 or second output gear 38 and second synchronizer 48 is in a neutral position and is disengaged from each of third output gear 44 and fourth output gear 46 and each of third output gear 44 and fourth output gear 46 may rotate freely relative to shaft 32.

Referring now to FIG. 5, axle assembly 2 is providing power between motor 20 and ground engaging members 14 in a third gear through the third gear mesh including third output gear 44 and third input gear 56 defining a third power transmission path. That is, power is provided from electric motor 20 to rotate output gear 22 which is meshedly engaged with input gear 36. A rotation of input gear 36 rotates shaft 32 of intermediate shaft assembly 30. In the third gear, second synchronizer 48 engages third output gear 44 and rotates third output gear 44 with shaft 32. Third output gear 44 is meshedly engaged with third input gear 56 and a rotation of third output gear 44 rotates third input gear 56. Third input gear 56 is rotatably coupled to outer casing 62 and a rotation of outer casing 62 rotates carrier 106 which rotates output gears 74 to provide rotational power to first output shaft 16 and second output shaft 18. As outer casing 62 rotates carrier 106, planet carrier 69 is coupled to carrier 106 and is also rotated with outer casing 62.

In embodiments, axle assembly 2 is configured to shift into a fourth gear ratio defining a fourth power transmission path. In the fourth gear ratio, second synchronizer is configured to engage fourth output gear 46 and power is transferred between fourth output gear 46 to fourth input gear 58 and thereby outer casing 62. Power is then transferred through outer casing 62 to first output shaft 16 and second output shaft 18 as previously described.

In embodiments, in each of the third gear and the fourth gear, second synchronizer 42 is engaged with either of third output gear 44 or fourth output gear 46 and first synchronizer 42 is in a neutral position and is disengaged from each of first output gear 40 and second output gear 38 and each of first output gear 40 and second output gear 38 may rotate freely relative to shaft 32.

Referring to FIGS. 4-5, the first power transmission path and second power transmission path have lower gear ratios than third power transmission path and fourth power transmission path. Further, first power transmission path and second power transmission path provide power to the ground engaging members 14 through planetary gearset 64 and each of third power transmission path and fourth transmission path provide power to the ground engaging members 14 independent of the planetary gearset 64. In embodiments, one power transmission path of the plurality of power transmission paths provides power to the ground engaging members 14 through the planetary gearset 64 and the remaining power transmission paths of the plurality of power transmission paths provide power to the ground engaging members 14 independent of the planetary gearset. In embodiments, one power transmission path of the plurality of power transmission paths provides power to the ground engaging members 14 independent of the planetary gearset 64 and the remaining power transmission paths of the plurality of power transmission paths provide power to the ground engaging members 14 through the planetary gearset 64. As vehicle speed increases, axle assembly 2 is configured to shift between the plurality of power transmission paths to increase efficiency and maximize power output.

To further increase efficiency, axle assembly 2 includes a first pair of power transmission power paths that provide power through planetary gearset 64 and includes a second pair of power transmission paths that provide power independent of planetary gearset 64. The second pair of power transmission paths are configured to operate the vehicle at higher speeds, and by providing power to ground engaging members 14 independent of the planetary gearset, the efficiency of the second pair of power transmission paths is increased. The increased efficiency may increase battery life, reduce wear on components of axle assembly 2, and increase top speed of ground engaging members 14. Further, by providing the first pair of power transmission paths that provide power through the planetary gearset 64, axle assembly 2 may still provide a high torque, low speed option for accelerating the vehicle from a standstill or from lower speeds.

Figure 6:
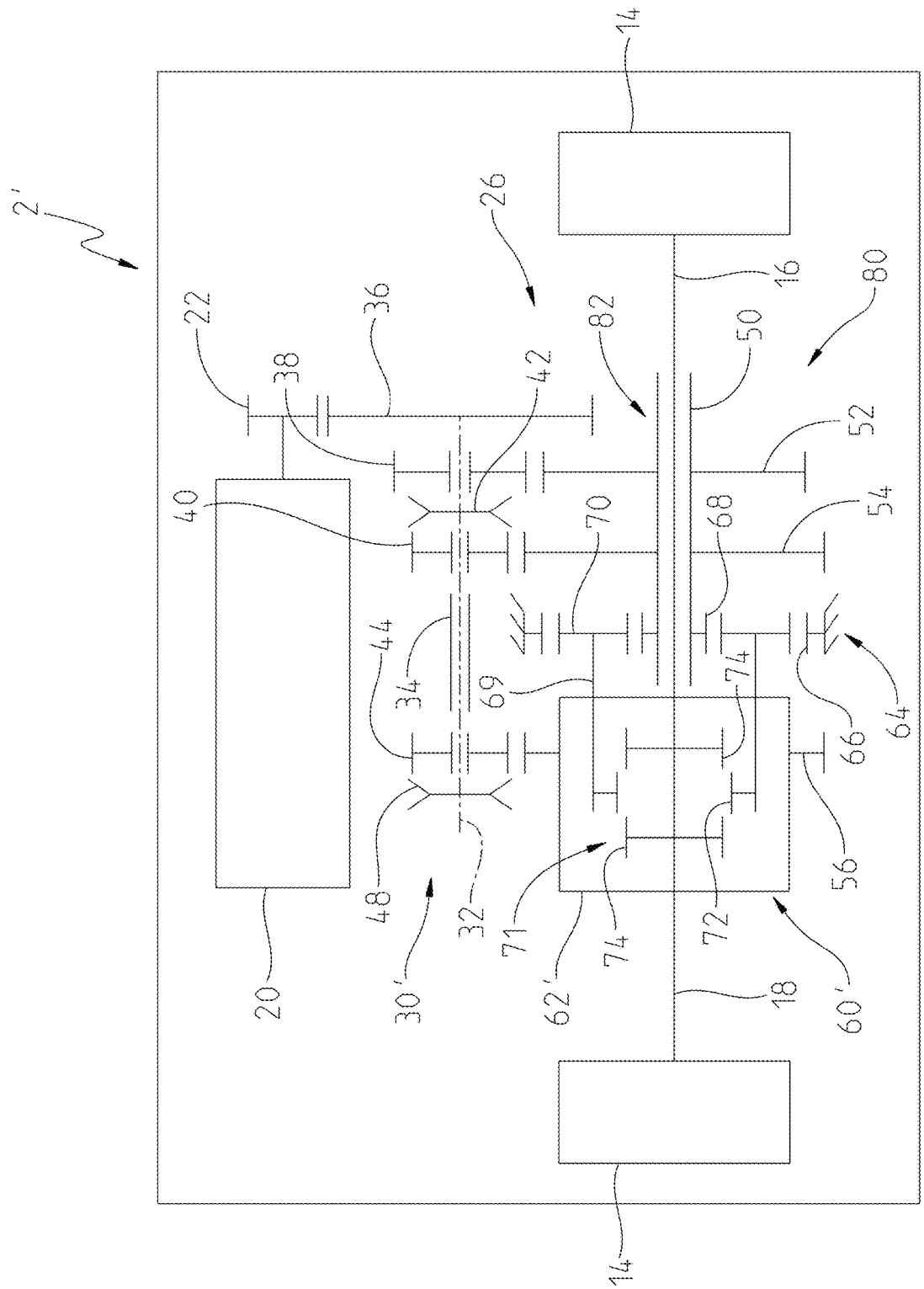
FIG. 6 is a stick diagram of an alternative axle assembly of the present disclosure.

Referring to FIGS. 6-7, alternative axle assemblies are provided including a first alternative axle assembly 2' (FIG. 6) and a second alternative axle assembly 2'' (FIG. 7). First alternative axle assembly 2' includes first power transmission path including first output gear 40 selectively coupleable with first input gear 54 and second power transmission path including second output gear 38 selectively coupleable with second input gear 52. Each of first power transmission path and second power transmission path provide power to ground engaging members 14 through planetary gearset 64. Alternative axle assembly 2' further includes a third power transmission path including third output gear 44 and third input gear 56 which provides power to ground engaging members 14 independent of planetary gearset 64. Second alternative axle assembly 2'' includes first power transmission path including first output gear 40 selectively coupleable with first input gear 54 and second power transmission path including second output gear 38 selectively coupleable with second input gear 52. Each of first power transmission path and second power transmission path provide power to ground engaging members 14 through planetary gearset 64. Alternative axle assembly 2'' further includes a third power transmission path including fourth output gear 46 and fourth input gear 58 which provides power to ground engaging members 14 independent of planetary gearset 64. In embodiments axle assembly 2 includes a fifth power transmission path which may include a fifth power transmission component (not shown), or fifth output gear positioned on intermediate shaft 32 of intermediate shaft assembly 30, and the fifth power transmission component may be configured to meshedly engage with a fifth input gear positioned either along shaft 50 or on outer casing 62. Fifth power transmission path may be configured to provide an additional path that provides power to ground engaging members 14 through planetary gearset 64 or independent of planetary gearset 64.

Referring again to FIGS. 1 and 9, each of motor 20, intermediate shaft assembly 30 and output assembly 80 are positioned within housing 4. Motor 20 is positioned at least partially longitudinally forwardly of intermediate shaft assembly 30 which is positioned at least partially longitudinally forwardly of output assembly 80. That is, intermediate shaft assembly 30 is positioned at least partially intermediate motor 20 and output assembly 80. Further, each of motor 20, intermediate shaft assembly 30 and output assembly 80 are at least partially laterally aligned along a longitudinal axis L extending through axle assembly 2. In embodiments, longitudinal axis L is a longitudinal centerline L of axle assembly 2 and a vehicle. In embodiments, electric motor 20 extends along, and has an output along, a first axis X1, intermediate shaft assembly 30 rotates about a second axis X2, and each of first output shaft 16 and second output shaft 18 of output assembly 80 rotate about a third axis X3, and each of first axis X1, second axis X2, and third axis X3 are substantially parallel to each other and substantially perpendicular to a vertical plane extending along the longitudinal axis L.

Figure 9:
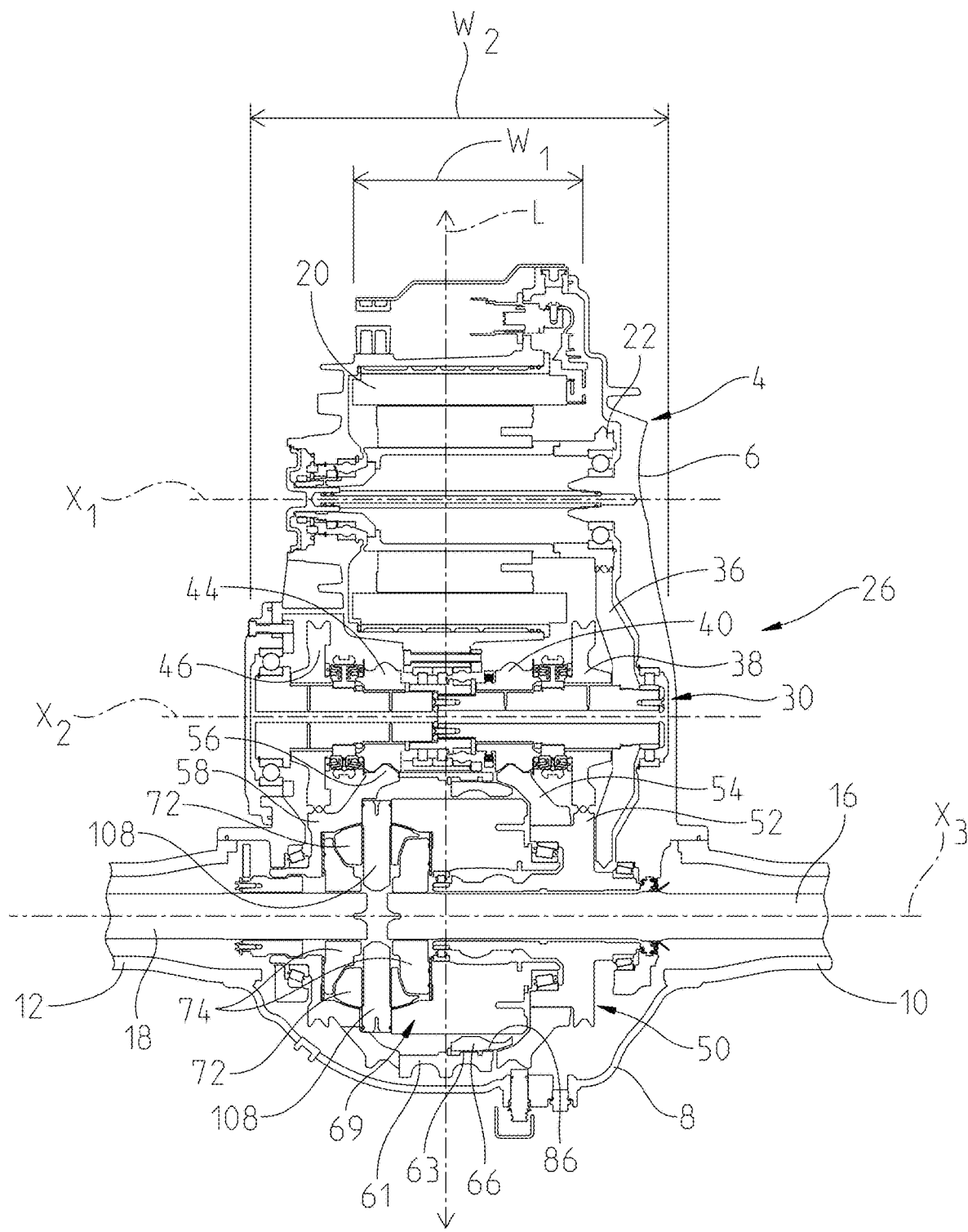
FIG. 9 is a cross-section view of the axle assembly of FIG. 1 taken along a horizontal plane.

Referring to FIG. 9, housing 4 has a compact width which allows for greater packaging flexibility, and motor 20 has a first width W1, and intermediate shaft assembly 30 has a second width W2, and first width W1 is less than second width W2. In embodiments, first width W1 is less than 80% of the second width W2. In embodiments, first width is between 50%-150% of the second width W2. In embodiments, the differential input 106, or carrier 106, is offset from the longitudinal centerline L. In embodiments, the differential input 106 is positioned along the longitudinal centerline L. In embodiments, at least a portion of the planetary gearset 64 is positioned on a first side of the longitudinal centerline L and at least a portion of the differential input 106 is on a second side of the longitudinal centerline L opposite the first side.

Figure 10:
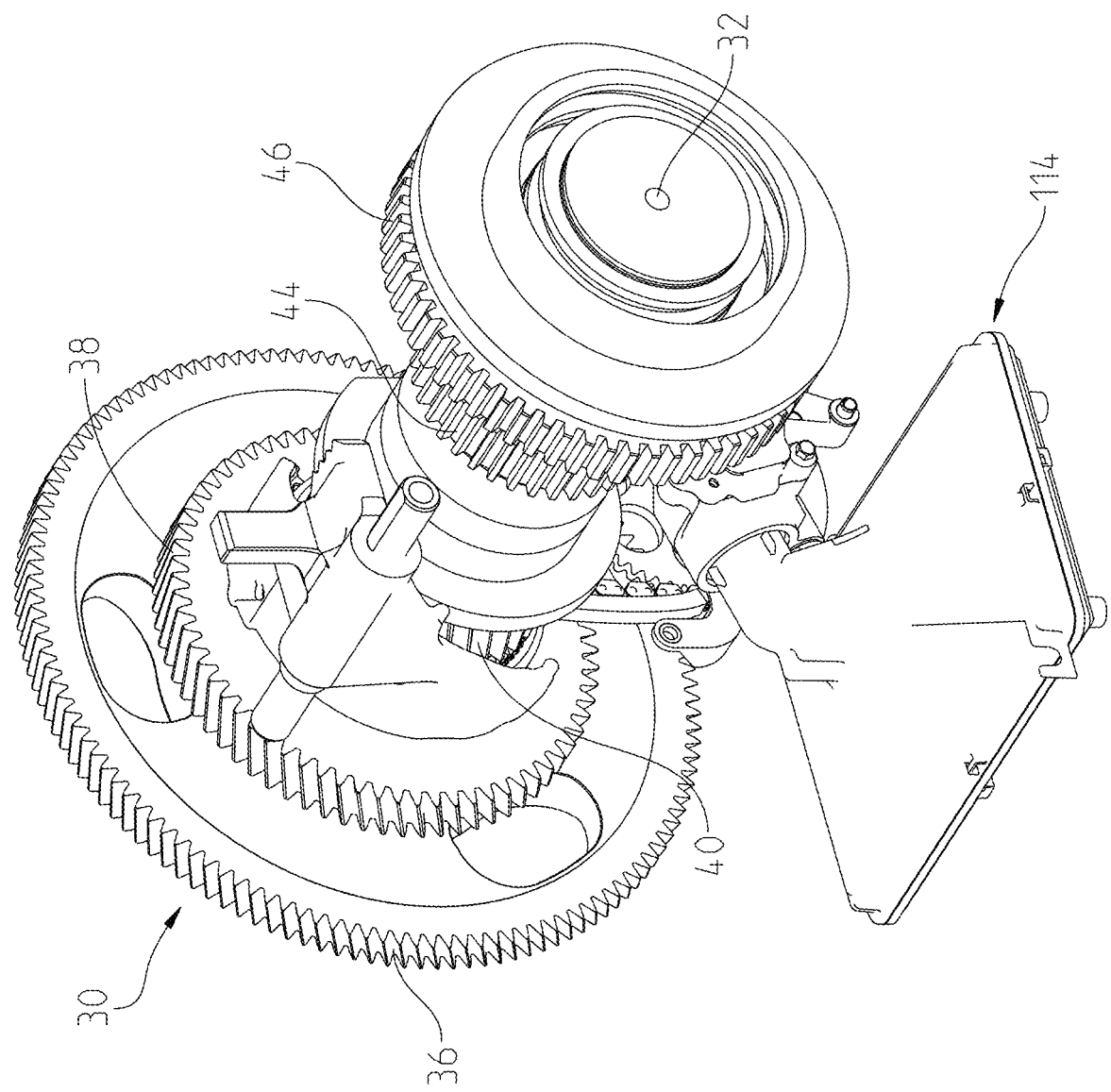
FIG. 10 is a perspective view of an intermediate shaft assembly of the axle assembly of FIG. 1.
Figure 11:
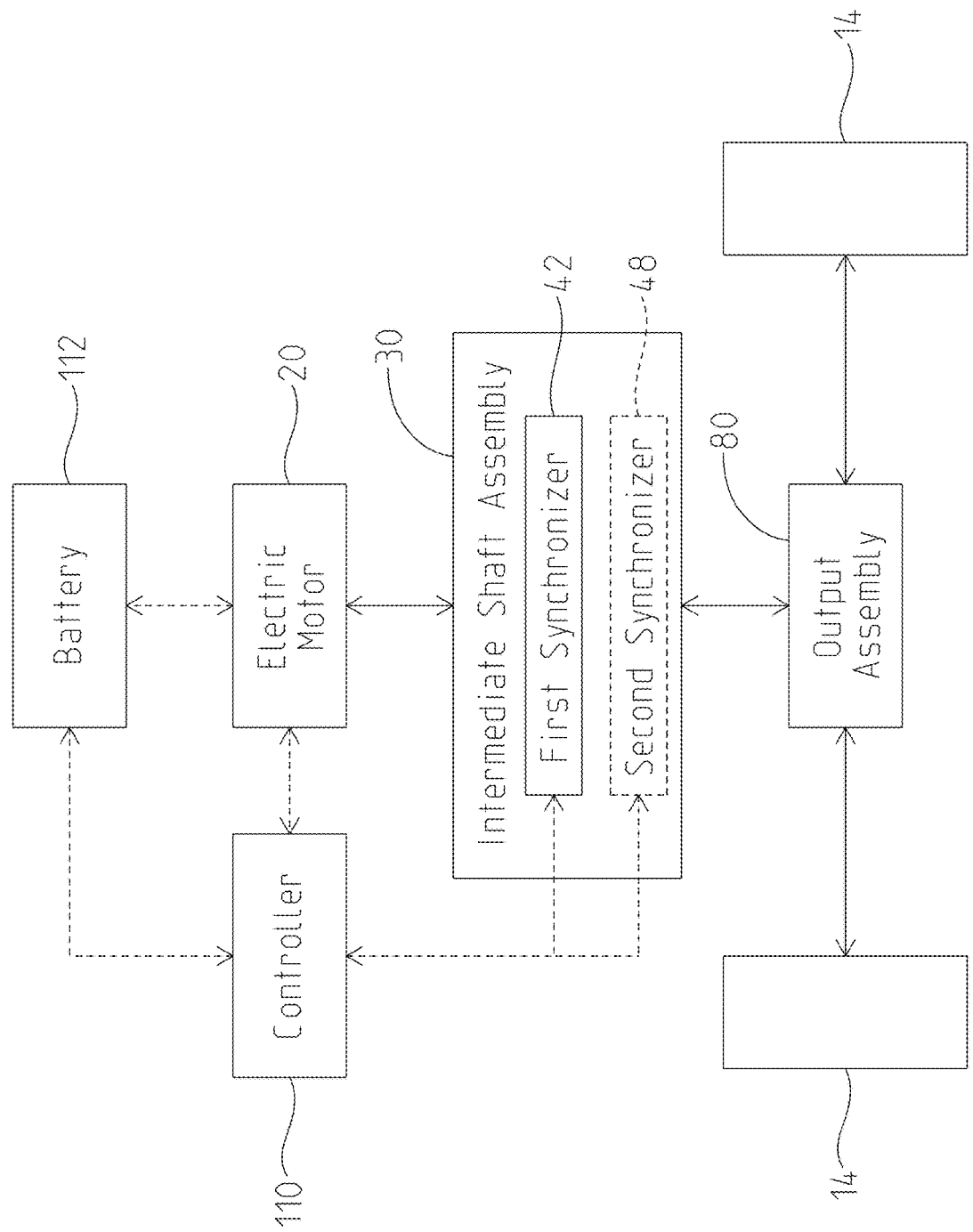
FIG. 11 is a diagrammatic view of an axle assembly of the present disclosure.

Referring to FIGS. 10-11, intermediate shaft assembly 30 is operably coupled to a controller 110. Controller 110 may be operably coupled to a battery 112, first synchronizer 42 and second synchronizer 48, and electric motor 20. Controller 110 may be a single controller, a plurality of controllers, a dispersed controller, or a unitary controller. Controller 110 may include one or more of a battery controller, a motor controller, or another electronic controller. Controller 110 may be configured to control an actuator assembly 114 which may actuate, or translate, first synchronizer 42 between a disengaged position and an engaged position and second synchronizer 48 between a disengaged position and an engaged position. In embodiments, controller 110 is configured to send and receive information from one or more sensors from the vehicle or from axle assembly 2. Information may include a battery status, battery charge, battery discharge rate, motor speed, motor torque, motor voltage, motor current, first synchronizer 42 position, and second synchronizer 48 position. In embodiments, controller 110 may be configured to receive an input from a vehicle operator, such as a gear shift request, a throttle input, a brake input, and a steering input. In embodiments, controller 110 is operably coupled to one or more of an accelerometer, gyroscope, inertial measurement unit (IMU), GPS, or other positioning or orientation device.

Figure 12:
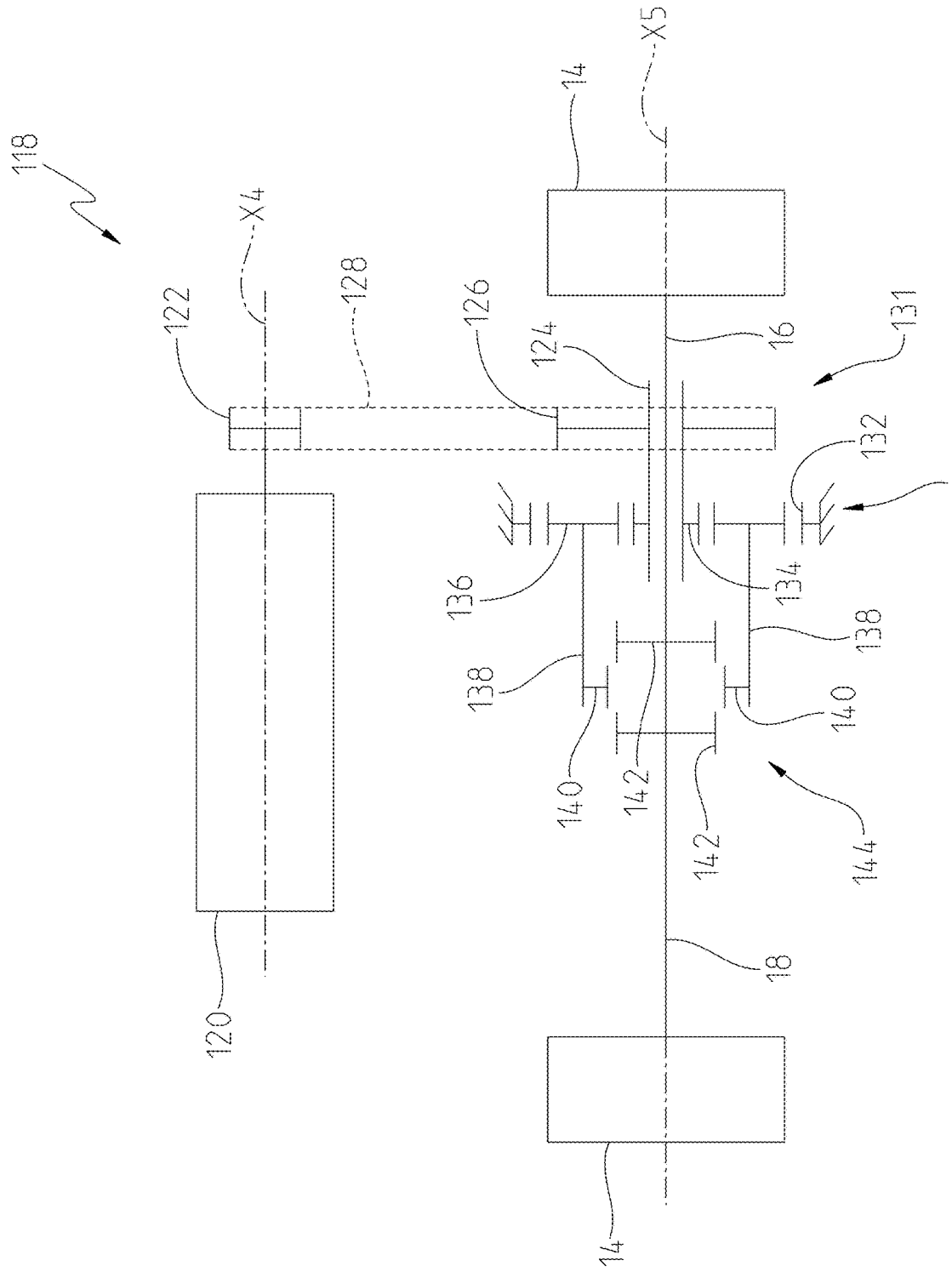
FIG. 12 is a stick diagram of an alternative axle assembly of the present disclosure.

Referring now to FIG. 12, an alternative axle assembly 118 is provided comprising an electric motor 120 operably coupled to output shafts 16, 18 and ground engaging members 14. Axle assembly 118 comprises an output member 122 rotatably coupled to electric motor 120. Output member 122 extends generally laterally outwardly along axis X4. Output member 122 may be an output power transmission component, or output sprocket 122. An intermediate shaft 124 comprises an input power transmission component 126, or input member 126 which may be an input gear, or input sprocket 126. An endless member 128 extends between and rotatably couples output member 122 and input member 126. Endless member 128 may be a belt, a chain, or other endless member configured to rotatably couple output member 122 and input member 126. Intermediate shaft 124 comprises an output member 134, or geared end 134. In embodiments, input member 126 may be positioned on, or adjacent to, a first end of intermediate shaft 124 and output member 134 is positioned on, or adjacent to, a second end of intermediate shaft 124 generally opposite input member 126. In embodiments, each of input member 126 and output member 134 are integral to intermediate shaft 124.

Alternative axle assembly 118 comprises an output assembly 131 comprising a planetary gearset 130 and an output member 134. In embodiments, planetary gearset 130 rotates about an axis X5. In embodiments, axis X5 is substantially parallel to axis X4. Planetary gearset 130 may be operably coupled to intermediate shaft 124 by geared end 134, or input 134. That is, the output member 134 of the intermediate shaft 124 is the sun gear of planetary gearset 130, and planetary gearset 130 also includes a ring gear 132 and a plurality of planet gears 136 operably coupled between sun gear 134 and ring gear 132. Planet gears 136 may be housed within a planet carrier 138. An output member 144 is operably coupled to planetary gearset 130. Output member 144 may be a differential which includes a plurality of pinion gears 140 and output gears 142. In embodiments, output member 144 rotates about axis X5. In embodiments, a pair of pinion gears 140 are operably coupled to planetary gearset 130, and a pair of output gears 142 are operably coupled between pinion gears 140 and output shafts 16, 18. That is, a rotation of planetary gearset 130 rotates differential 144 and output shafts 16, 18. In embodiments, output gears 142 are operably coupled to output shafts 16, 18. In embodiments, output shaft 16 extends through intermediate shaft 124. In embodiments, the intermediate shaft and the output shaft 16 are coaxial. In embodiments, planetary gearset 130 is positioned laterally intermediate power transmission component 126 and output member 144.

Rotational power is supplied to output member 122 by motor 120, and output member 122 is rotatably coupled to endless member 128. A rotation to output member 122 moves endless member 128, thereby rotating input power transmission component 126 and intermediate shaft 124. Rotational power to intermediate shaft 124 provides input power to planetary gearset 130 which provides power to output member 144. Output member 144 is operably coupled to, and provides rotational power to, ground engaging members 14. Axle assembly 118 is configured to provide at least two separate ratio drops. That is, a first ratio drop is defined by the speed differential created between output member 122 and input power transmission component 126, and a second ratio drop is defined by the speed differential created between input power transmission component 126 and the output of planetary gearset 130. In embodiments, planetary gearset 130 may be configured to provide one, two, three, or more distinct input-to-output speed ratios. In embodiments, axle assembly 118 may be configured to increase the overall gear ratio. In embodiments, axle assembly 118 is not configured to alter the overall gear ratio. Axle assembly 118 is configured to provide a longitudinally compact assembly to reduce packaging space. That is, electric motor 120 may be placed adjacent output assembly 131 without an intermediate shaft intermediate. In embodiments, endless member 128 may be a chain to reduce frictional losses within axle assembly 118.

In embodiments, alternative axle assembly 118 is completely positioned within a housing which may be similar to housing 4. In embodiments, a controller (similar to controller 110) is configured to provide instructions to the electric motor (e.g., motor 120) to control one or more of a speed, torque, voltage, and/or current of the electric motor.

Figure 13:
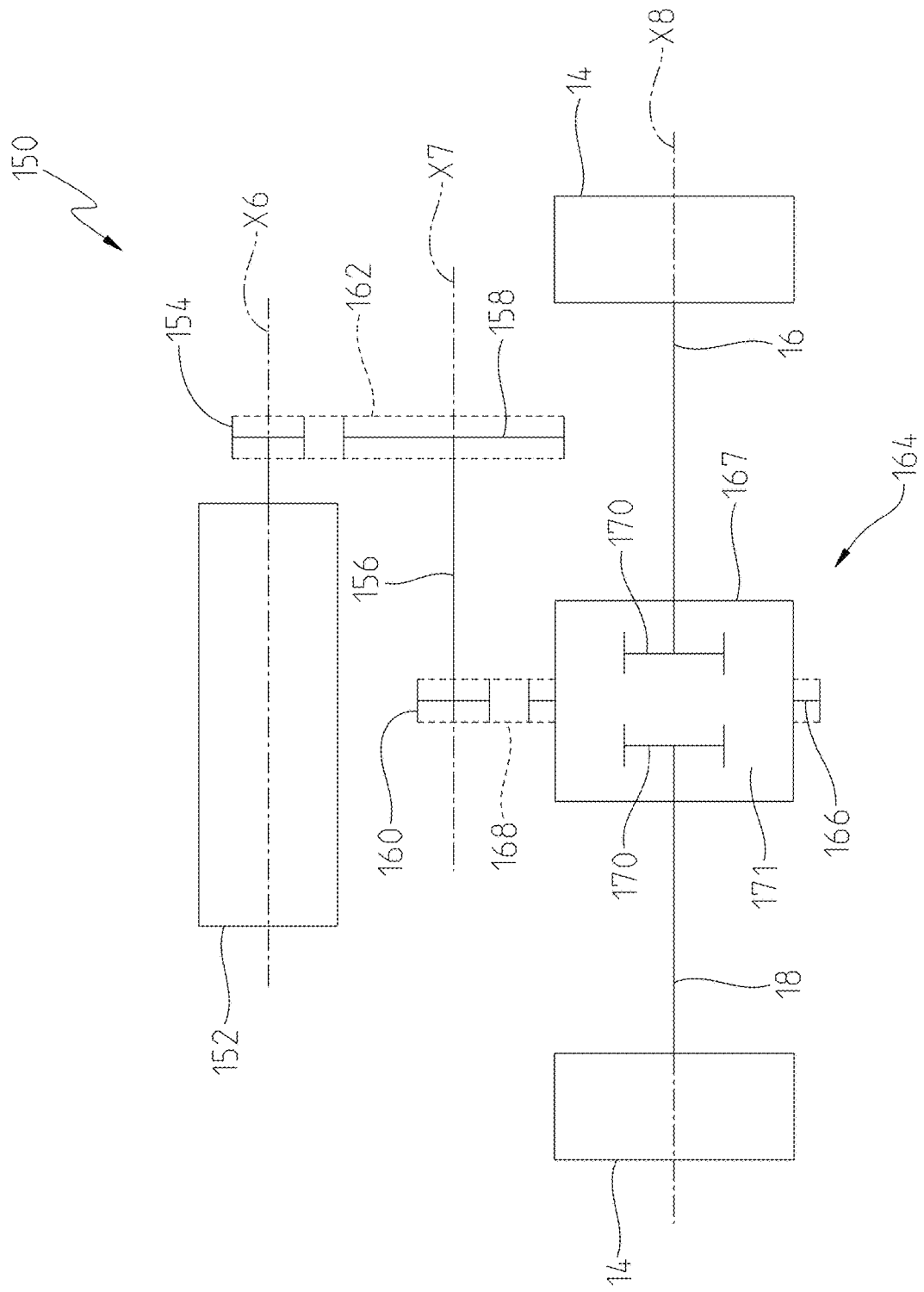
FIG. 13 is a stick diagram of an alternative axle assembly of the present disclosure.

Referring now to FIG. 13, an alternative axle assembly 150 includes an electric motor 152, an output member 164, and an intermediate shaft assembly 156 operably coupled intermediate electric motor 152 and output member 164. Electric motor 152 may be configured to rotate an output power transmission component 154, or output member 154. In embodiments, output power transmission component 154 extends outwardly along and rotates about an axis X6. Electric motor 152 is operably coupled to ground engaging members 14 through output shafts 16, 18, and output shafts 16, 18 may be operably coupled to output member 164. An intermediate shaft assembly 156 is coupled intermediate motor 152 and output member 164. In embodiments, intermediate shaft assembly 156 extends laterally along an axis X7. Intermediate shaft assembly 156 comprises an input power transmission component 158, or input member 158, and an output power transmission component 160, or output member 160. In embodiments, input member 158 and input member 160 are differently sized. In embodiments, input member 158 and input member 160 are similarly sized. In embodiments, one or more of output member 154, input member 158, and output member 160 are sprockets. In embodiments, one or more of output member 154, input member 158, and output member 160 are gears. An endless member 162 extends between output member 154 and input member 158 and transfers rotational power from output member 154 to input member 158 of intermediate shaft assembly 156. In embodiments, output member 154 and input member 158 are gears and are meshedly engaged to transfer rotational power between output member 154 and input member 158.

In embodiments, output member 164 is a differential. In embodiments, output member 164 may comprise a housing 167 and may be similar to differential 60. Output member 164 includes an input 166 and an output 170. In embodiments, input 166 is a gear, or sprocket, coupled to a housing 167 and housing 167 is rotatably coupled to output 170. In embodiments, input 166 is integral with the housing 167. In embodiments, input 166 is a gear surrounding an outer surface 171 of housing 167. In embodiments, output 170 is a pair of output pinion gears, and each pinion gear is operably coupled to output shafts 16, 18, respectively. In embodiments, an endless member 168 extends between output member 160 and input member 166 and transfers rotational power from output member 160 of intermediate shaft assembly 156 to input 166 of differential 164. In embodiments, output member 160 and input member 166 are gears and are meshedly engaged to transfer rotational power between output member 160 and input member 166. In embodiments, housing 167 is rotatable about an axis generally parallel to the power source output 154. In embodiments, housing 167 is rotatable about an axis X8 extending through output members 16, 18. In embodiments, each of axis X6, axis X7, and axis X8 are substantially parallel to each other.

In embodiments, alternative axle assembly 150 is completely positioned within a housing which may be similar to housing 4. In embodiments, a controller (similar to controller 110) is configured to provide instructions to the electric motor (e.g., motor 152) to control one or more of a speed, torque, voltage, and/or current of the electric motor.

Figure 14:
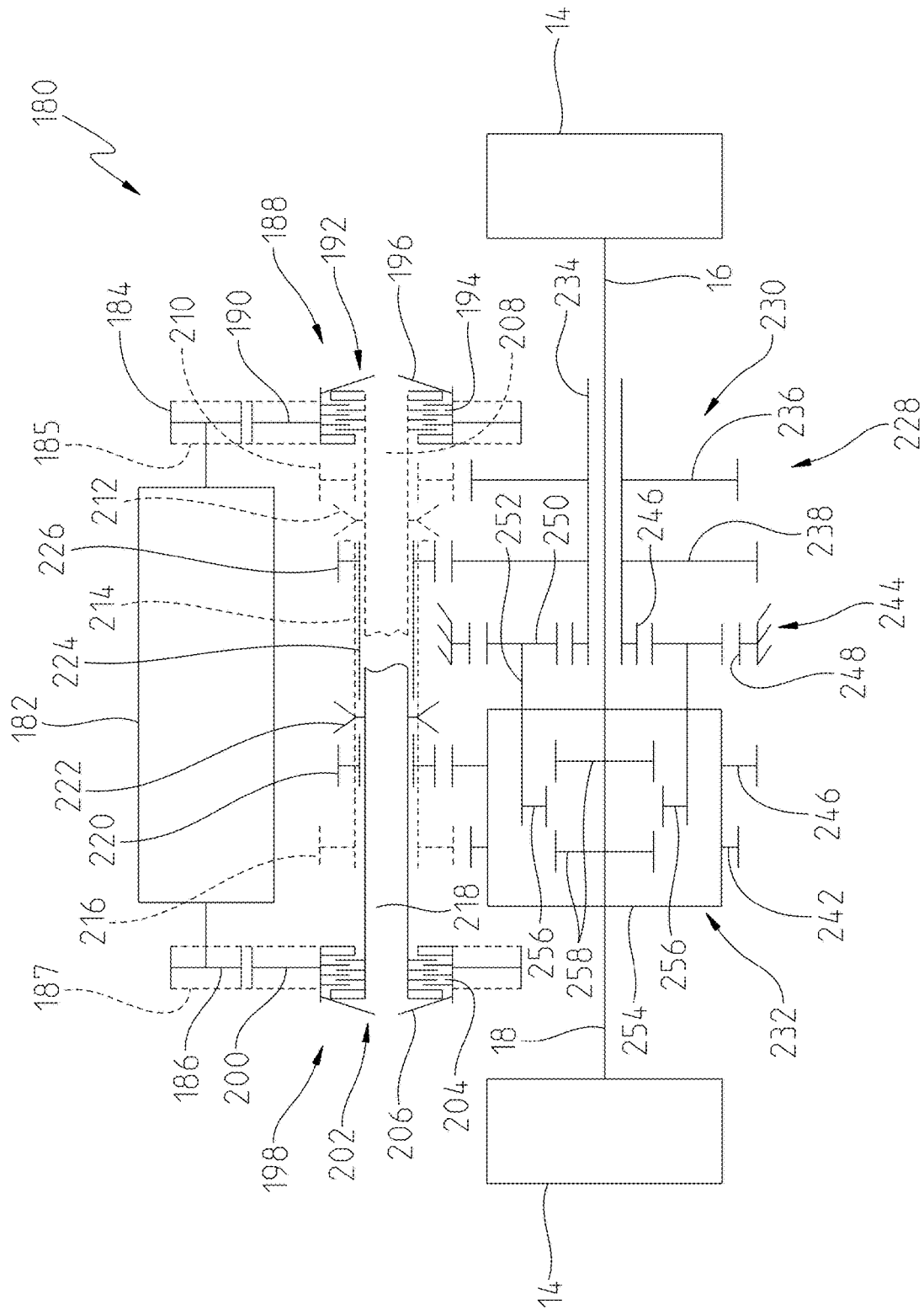
FIG. 14 is a stick diagram of an alternative axle assembly of the present disclosure.
Figure 15A:
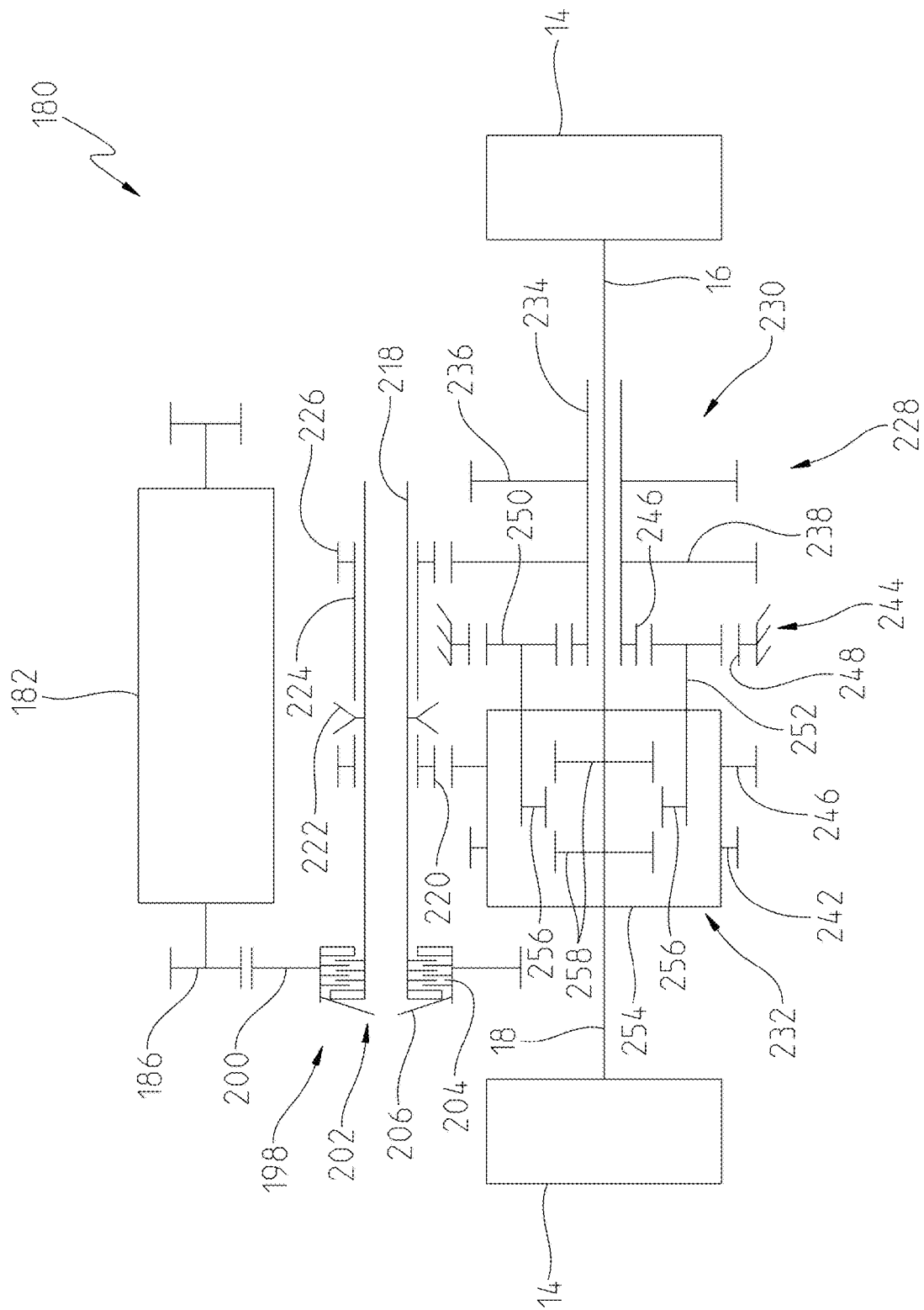
FIG. 15A is a stick diagram of a portion of the alternative axle assembly of FIG. 14.
Figure 15B:
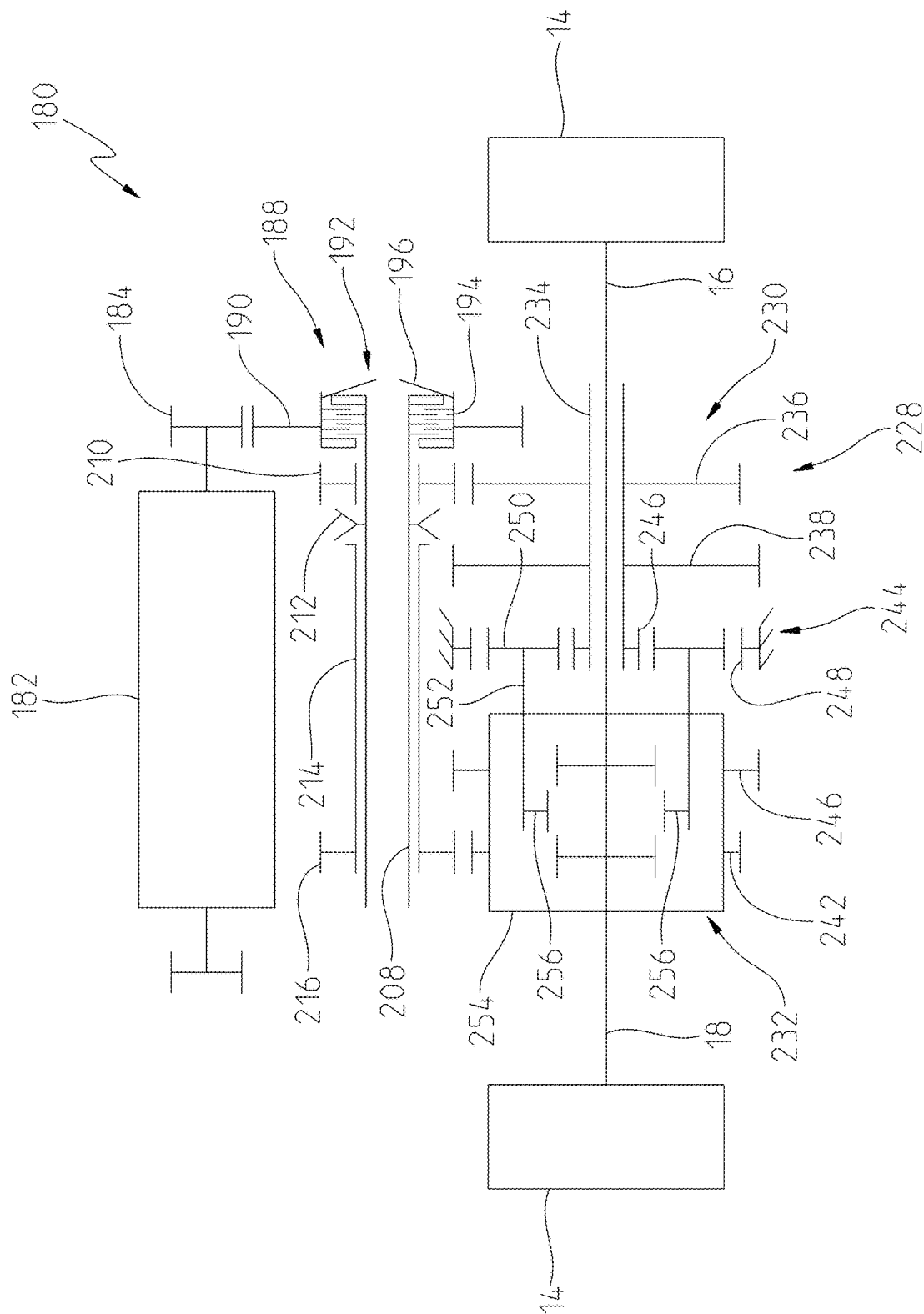
FIG. 15B is a stick diagram of a portion of the alternative axle assembly of FIG. 14.
Figure 16:
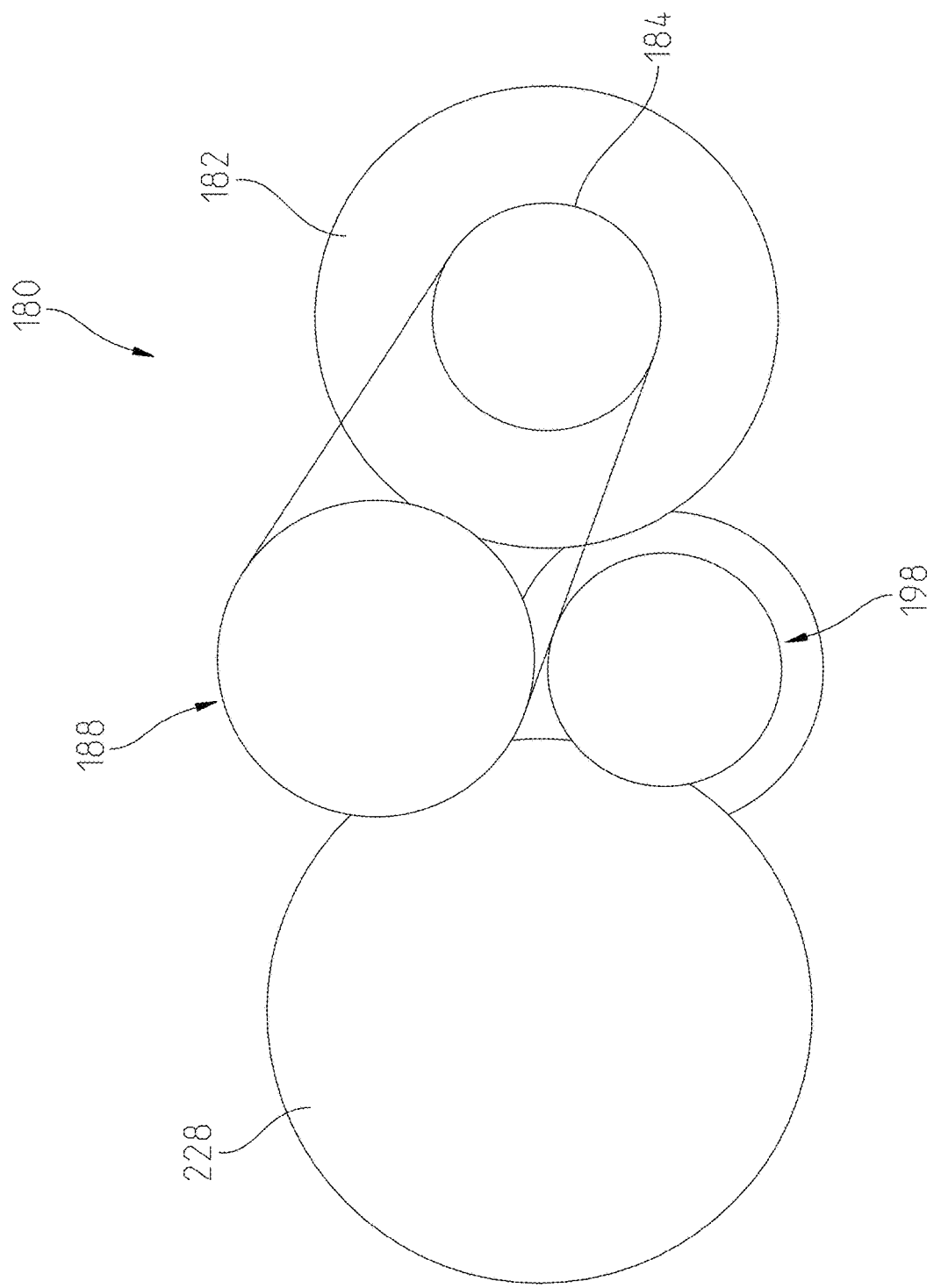
FIG. 16 is a side perspective view of the alternative axle assembly of FIG. 14.

Now referring to FIGS. 14-16, an alternative driveline assembly or axle assembly 180 is provided including an electric motor 182, a first intermediate shaft assembly 188, a second intermediate shaft assembly 198, and an output assembly 228. Electric motor 182 includes a first output 184 and a second output 186 extending out each lateral end, respectively, of electric motor 182. That is, each of outputs 184, 186 are rotatably coupled to electric motor 182. In embodiments, first output 184 extends outwardly from a first lateral end of motor 182 and second output 186 extends outwardly from a second lateral end of motor 182 opposite the first lateral end.

First intermediate shaft assembly 188 includes a clutch assembly 192 and a shaft 208 operably coupled to the clutch assembly 192. Clutch assembly 192 includes an input member 190 configured to transfer rotational power to a clutch pack 194. Input member 190 is rotationally coupled to first output 184 such that a rotational power to first output 184 provides rotational power to input member 190. Clutch assembly 192 also includes a biasing member 196 configured to compress or decompress clutch pack 194. In embodiments, when biasing member 196 is engaged, clutch pack 194 is compressed, and an operable connection is created between input member 190 and shaft 208. In embodiments, when biasing member 196 is disengaged, clutch pack 194 is decompressed, and an operable connection is removed between input member 190 and shaft 208. In embodiments, the biasing member 196 has a default position to decompress clutch pack 194. Shaft 208 includes a first output member 210 and an intermediate shaft 214 comprising a second output member 216. Intermediate shaft 214 generally surrounds shaft 208, and a synchronizer 212 is coupled to shaft 208 and positioned intermediate first output member 210 and intermediate shaft 214. Synchronizer 212 is configured to translate between one or more positions to selectively couple shaft 208 to either of, or neither of, first output member 210 and intermediate shaft 214. In embodiments, first intermediate shaft assembly 188 does not include intermediate shaft 214 and synchronizer 212 is configured to translate between one or more positions to selectively couple shaft 208 to either of, or neither of, first output member 210 and second output member 216. In embodiments, in a first position, synchronizer 212 is configured to engage first output member 210 such that rotational power can be transmitted through shaft 208 to first output member 210, and in a second position, synchronizer 212 is configured to engage intermediate shaft 214 such that rotational power can be transmitted through shaft 208 to intermediate shaft 214 and second output member 216.

Still referring to FIGS. 14-16, second intermediate shaft assembly 198 includes a clutch assembly 202 and a shaft 218 operably coupled to the clutch assembly 202. Clutch assembly 202 includes an input member 200 configured to transfer rotational power to a clutch pack 204. Input member 200 is rotationally coupled to second output 186 such that a rotational power to second output 186 provides rotational power to input member 200. Clutch assembly 202 also includes a biasing member 206 configured to compress or decompress clutch pack 204.

In embodiments, when biasing member 206 is engaged, clutch pack 204 is compressed, and an operable connection is created between input member 200 and shaft 218. In embodiments, the biasing member 206 has a default position to decompress clutch pack 204. Shaft 218 includes a first output member 220 and an intermediate shaft 224 comprising a second output member 226. Intermediate shaft 224 generally surrounds shaft 218, and a synchronizer 222 is positioned intermediate first output member 220 and intermediate shaft 224. Synchronizer 222 is configured to translate between one or more positions to selectively couple shaft 218 to either of, or neither of, first output member 220 and intermediate shaft 224. In embodiments, second intermediate shaft assembly 198 does not include intermediate shaft 224 and synchronizer 222 is configured to translate between one or more positions to selectively couple shaft 218 to either of, or neither of, first output member 220 and second output member 226. In embodiments, in a first position, synchronizer 222 is configured to engage first output member 220 such that rotational power can be transmitted through shaft 218 to first output member 220, and in a second position, synchronizer 222 is configured to engage intermediate shaft 224 such that rotational power can be transmitted through shaft 218 to intermediate shaft 224 and second output member 226.

Still referring to FIGS. 14-16, output assembly 228 comprises a geartrain 230 and an output member 232. Output assembly 228 may be similar, or identical to, output assembly 80 of axle assembly 2. That is, geartrain 230 of output assembly 228 includes an intermediate shaft 234 generally surrounding and extending along a portion of first output shaft 16. A first input member 236, or first input gear 236 is operably coupled to intermediate shaft 234 and configured to engage first output member 210. A second input member 238, or second input gear 238 is operably coupled to intermediate shaft 234 and configured to engage second output member 226. A third input member 240, or third input gear 240 is operably coupled to output member 232 and configured to engage first output member 220. A fourth input member 242, or fourth input gear 242 is operably coupled to output member 232 and configured to engage second output member 216. Geartrain 230 also includes a planetary gearset 244 including a ring gear 248, a sun gear 246 operably coupled to intermediate shaft 234, and a plurality of planet gears 250 operably coupled between sun gear 246 and ring gear 248. In embodiments, sun gear 246 is integral with intermediate shaft 234. Further, planetary gearset 244 includes a planet carrier 252 configured to support the plurality of planet gears 250 and couple to output member 232.

Output assembly 228 also includes output member 232 which may be a differential 232 comprising an outer casing 254, a plurality of input pinion gears 256 and a plurality of output gears 258. Illustratively, each of third input member 240 and fourth input member 242 are operably coupled to outer casing 254. In embodiments, one or more of third input member 240 and fourth input member 242 are integral to outer casing 254, and outer casing 254 is operably coupled to input pinion gears 256 such that a rotational output to either of third input member 240 or fourth input member 242 rotates outer casing 254 and thereby rotates input pinion gears 256 to rotate output shafts 16, 18 and ground engaging members 14.

Still referring to FIGS. 14-16, an input to either of first input member 236 or second input member 238 may rotate intermediate shaft 234 and may rotate sun gear 246 of intermediate shaft 234 of planetary gearset 244. In embodiments, rotation of planetary gearset 244 may rotate planet gears 250 and planet carrier 252 which may be operably coupled to input pinion gears 256.

Referring to FIGS. 14-16, each of first intermediate shaft assembly 188 and second intermediate shaft assembly 198 are vertically offset and the longitudinal packaging of axle assembly 180 is reduced (FIG. 16). That is, in embodiments, at least a portion of first intermediate shaft assembly 188 is vertically above the second intermediate shaft assembly 198. In embodiments, at least a portion of second intermediate shaft assembly 198 is vertically above the first intermediate shaft. Further, each intermediate shaft assembly 188, 198 includes clutch assembly 192, 202, respectively, configured selectively engage the respective intermediate shaft assembly 188, 198 depending on a desired gear ratio of axle assembly 180. In embodiments, the meshed connection between first intermediate shaft assembly 188 and output assembly 228 includes a first gear ratio (e.g., between first output member 210 and first input member 236) and a fourth gear ratio (e.g., between second output member 216 and fourth input member 242) and the meshed connection between second intermediate shaft assembly 198 and output assembly 228 includes a second gear ratio (e.g., between second output member 226 and second input member 238) and a third gear ratio (e.g., between first output member 220 and third input member 240). In embodiments, the first gear ratio is less than the second gear ratio which is less than the third gear ratio which is less than the fourth gear ratio. Further, each of intermediate shaft assembly 188, 198 includes clutch assembly 192, 202 to selectively engage either shaft 208, 218 with electric motor 182 to selectively engage one of the first gear ratio, second gear ratio, third gear ratio, and fourth gear ratio.

In embodiments, in a default state, each of first clutch pack 194 and second clutch pack 204 are in a decompressed position to operably decouple shaft 208 and shaft 218 from electric motor 182. In embodiments, to engage the first gear ratio (e.g., between first output member 210 and first input member 236), clutch assembly 192 is engaged by engaging biasing member 196 to compress clutch pack 194 and operably couple shaft 208 to electric motor 182. Further, synchronizer 212 is configured to move to engage first output member 210 to allow first output member 210 to rotate with shaft 208. That is, by compressing clutch pack 194 and engaging synchronizer 212 with first output member 210, axle assembly 180 is configured to operate in the first gear ratio. In embodiments, when the axle assembly 180 is operating in the first gear ratio, clutch pack 204 of second intermediate shaft assembly 198 is decompressed and shaft 218 rotates freely independent of electric motor 182.

In embodiments, to engage the second gear ratio (e.g., between second output member 226 and second input member 238), clutch assembly 202 is engaged by engaging biasing member 206 to compress clutch pack 204 and operably couple shaft 218 to electric motor 182. Further, synchronizer 222 is configured to move to engage intermediate shaft 224 to allow second output member 226 to rotate with shaft 218. That is, by compressing clutch pack 204 and engaging synchronizer 222 with second output member 226 on intermediate shaft 224, axle assembly 180 is configured to operate in the second gear ratio. In embodiments, when the axle assembly is operating in the second gear ratio, clutch pack 194 of first intermediate shaft assembly 188 is decompressed and shaft 208 rotates freely independent of electric motor 182.

In embodiments, to engage the third gear ratio (e.g., between first output member 220 and third input member 240), clutch assembly 202 is engaged by engaging biasing member 206 to compress clutch pack 204 and operably couple shaft 218 to electric motor 182. Further, synchronizer 222 is configured to move to engage first output member 220 to allow first output member 220 to rotate with shaft 218. That is, by compressing clutch pack 204 and engaging synchronizer 222 with first output member 220, axle assembly 180 is configured to operate in the third gear ratio. In embodiments, when the axle assembly is operating in the third gear ratio, clutch pack 194 of first intermediate shaft assembly 188 is decompressed and shaft 208 rotates freely independent of electric motor 182.

In embodiments, to engage the fourth gear ratio (e.g., between second output member 216 and fourth input member 242), clutch assembly 192 is engaged by engaging biasing member 196 to compress clutch pack 194 and operably couple shaft 208 to electric motor 182. Further, synchronizer 212 is configured to move to engage intermediate shaft 214 to allow second output member 216 to rotate with shaft 208. That is, by compressing clutch pack 194 and engaging synchronizer 212 with second output member 216 on intermediate shaft 214, axle assembly 180 is configured to operate in the fourth gear ratio. In embodiments, when the axle assembly 180 is operating in the fourth gear ratio, clutch pack 204 of second intermediate shaft assembly 198 is decompressed and shaft 218 rotates freely independent of electric motor 182.

In embodiments, each of clutch assemblies 192, 202, are hydraulically controlled clutches. In embodiments, clutch assemblies 192, 202 may be wet clutches, or clutch assemblies 192, 202 may be dry clutches. In embodiments, clutch assemblies 192, 202 may be mechanically controlled, electronically controlled, or a combination of hydraulically, mechanically, or electronically controlled. In embodiments, each of synchronizers 212, 222 are hydraulically controlled. In embodiments, each of synchronizers 212, 222 are mechanically controlled or electronically controlled, or a combination of hydraulically, mechanically, or electronically controlled.

In embodiments, first output 184 is a gear and input member 190 is a gear, and first output 184 and input member 190 are meshedly engaged to transmit power between motor 182 and first intermediate shaft assembly 188. In embodiments, first output 184 is a sprocket and input member 190 is a sprocket and an endless member 185 extends between first output 184 and input member 190. Endless member 185 may be a belt, a chain, or other endless member to transmit power between motor 182 and first intermediate shaft assembly 188. In embodiments, second output 186 is a gear and input member 200 is a gear, and second output 186 and input member 200 are meshedly engaged to transmit power between motor 182 and second intermediate shaft assembly 198. In embodiments, second output 186 is a sprocket and input member 200 is a sprocket and an endless member 187 extends between second output 186 and input member 200. Endless member 187 may be a belt, a chain, or other endless member to transmit power between motor 182 and second intermediate shaft assembly 198.

In embodiments, axle assembly 180 allows for power shifting capabilities to create a smoother shifting experience and prevent large power disruptions during gear changes.

That is, when axle assembly 180 is operating in the first gear ratio (e.g., synchronizer 212 is engaged with first output member 210) and it is desired to shift to the second gear ratio, clutch assembly 202 may be controlled to engage biasing member 206 to compress clutch pack 204 to operably couple shaft 208 to motor 182. At the same time, or subsequent to compressing clutch pack 204, synchronizer 212 may be disengaged from first output member 210 and synchronizer 222 may be engaged with second output member 226 on intermediate shaft 224. That is, axle assembly 180 may seamlessly shift operation between the first gear ratio on first intermediate shaft assembly 188 and the second gear ratio on second intermediate shaft assembly 198 by allowing second intermediate shaft assembly 198 to come up to speed before shifting into the second gear ratio, which reduces the speed differential across the second intermediate shaft assembly 198 and reduces the pulses felt by the operator of the vehicle.

Figure 17A:
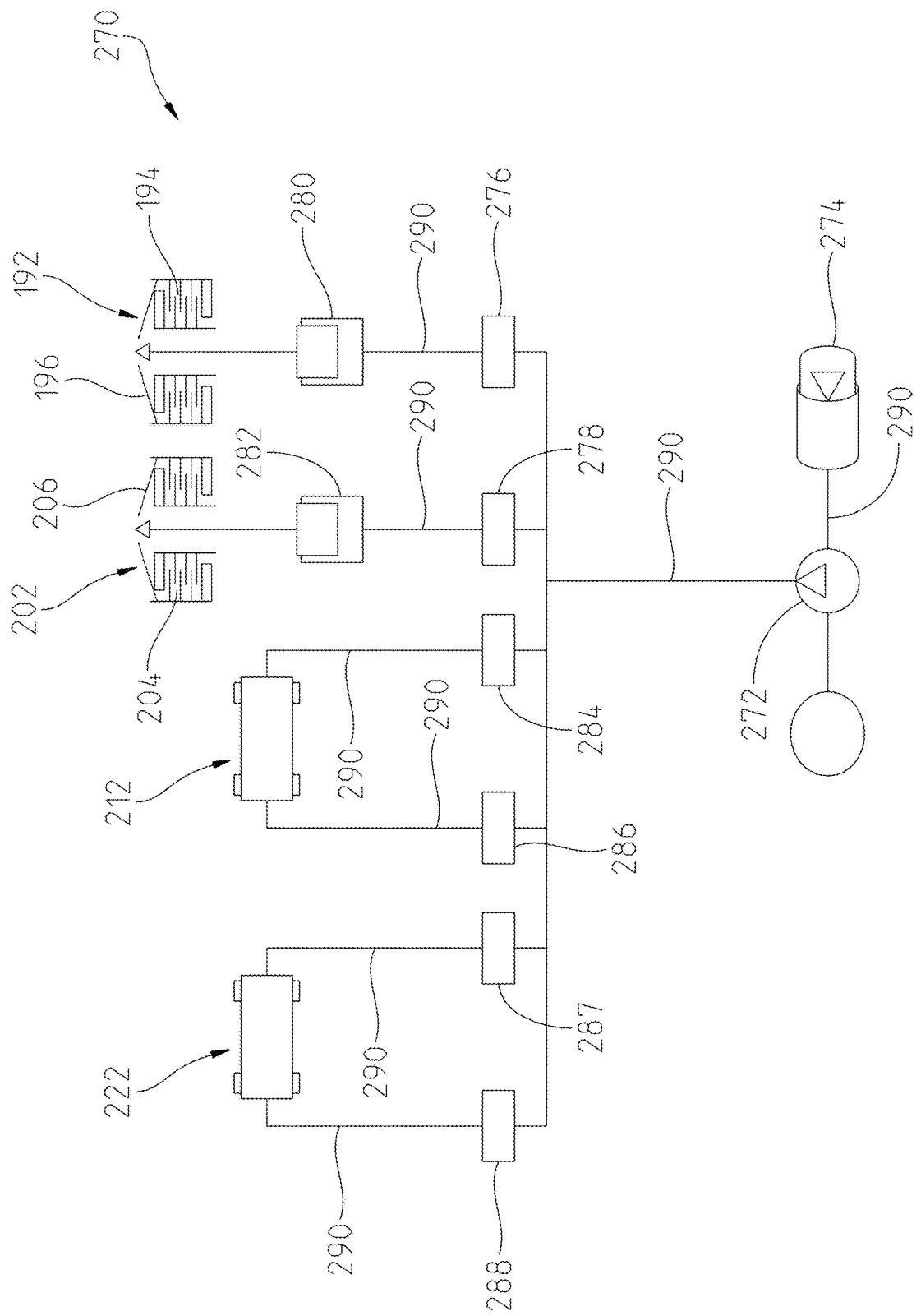
FIG. 17A is a diagrammatic view of a hydraulic system of the alternative axle assembly of FIG. 14.

Referring now to FIG. 17A, a shifting system 270 comprises a pump 272 fluidly coupled to an accumulator 274. Pump 272 is fluidly coupled to a first clutch valve 276, a second clutch valve 278, a first shift valve 284, a second shift valve 286, a third shift valve 287, and a fourth shift valve 288. First clutch valve 276 is operably coupled to a first piston 280 and second clutch valve 278 to a second piston 282. First piston 280 is configured to engage biasing member 196 of clutch assembly 192 and second piston 282 is configured to engage biasing member 206 of clutch assembly 202. That is, actuation of first piston 280 is configured to engage biasing member 196 to compress clutch pack 194 and operably couple electric motor 182 to shaft 208. Further, actuation of second piston 282 is configured to engage biasing member 206 to compress clutch back 204 and operably couple electric motor 182 to shaft 218. First shift valve 284 and second shift valve 286 are configured to operate synchronizer 212 and third shift valve 287 and fourth shift valve 288 are configured to operate synchronizer 222. In embodiments, first shift valve 284 is configured to operate to translate synchronizer 212 in a first direction (e.g., to engage a first of either of first output member 210 or second output member 216 on intermediate shaft 214) and second shift valve 286 is configured to operate to translate synchronizer in a second direction opposite the first direction (e.g., to engage a second of either first output member 210 or second output member 216 on intermediate shaft 214). In embodiments, third shift valve 287 is configured to operate to translate synchronizer 222 in a first direction (e.g., to engage a first of either first output member 220 or second output member 226 on intermediate shaft 224) and fourth shift valve 288 is configured to operate to translate synchronizer 222 in a second direction opposite the first direction (e.g., to engage a second of either first output member 220 or second output member 226 on intermediate shaft 224).

In embodiments, shifting system 270 is a hydraulic shifting system configured to shift synchronizers 212, 222 and control the compression/decompression of clutch assemblies 192, 202. In embodiments, a plurality of conduits 290 extend between pump 272, accumulator 274, and valves 276, 278, 284, 286, 287, 288. A fluid (e.g., water, air, oil, or other fluid substance) is configured to fill conduits 290 and is a working fluid configured to actuate pistons 280, 282 and synchronizers 212, 222. In embodiments, pump 272 is an electric pump electrically coupled to a battery (not shown; e.g., battery 112) and a controller (not shown; e.g., controller 110). In embodiments, pump 272 is a mechanical pump operably coupled to axle assembly 180. In embodiments, pump 272 is operably coupled to at least one of electric motor 182, first intermediate shaft assembly 188, second intermediate shaft assembly 198, and output assembly 228.

Accumulator 274 is configured to retain working fluid in a pressurized state in fluid communication with conduits 290 of shifting system 270. Accumulator 274 is configured to reduce pressure drops within shifting system 270 during operation of one or more of valves 276, 278, 284, 286, 287, 288. That is, for example, first clutch valve 276 is opened to allow working fluid to flow to biasing member 196 of clutch assembly 192, reducing the overall pressure of the working fluid within the shifting system 270. Accumulator 274 retains pressurized working fluid and fluid flows outwardly from accumulator 274 into conduits 290 when a pressure differential is created across accumulator 274 and shifting system 270 has a lower pressure than accumulator 274. Accumulator 274 is configured to assist in reducing pressure drops across shifting system 270 which helps create a smooth application of force to each of biasing members 196, 206 and to each of synchronizers 212, 222. Similarly, accumulator 274 is configured to fill as pressure is increased across shifting system 270.

Figure 17B:
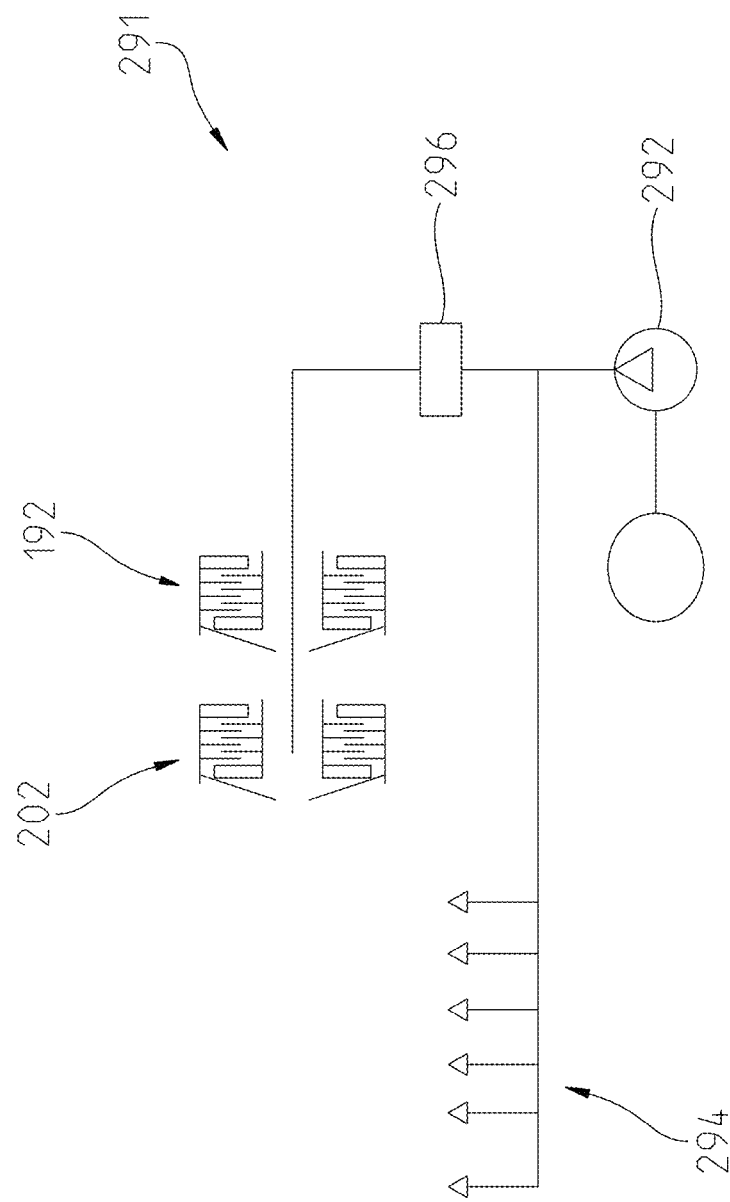
FIG. 17B is a diagrammatic view of a cooling system of the alternative axle assembly of FIG. 14.

Referring now to FIG. 17B, a cooling system 291 includes a pump 292 fluidly coupled to a first cooling load 294 and each of first clutch assembly 192 and second clutch assembly 202. In embodiments, cooling system 291 and shifting system 270 share a pump (e.g., pump 272 (FIG. 17A) is the same as pump 292). A valve 296 is fluidly coupled intermediate pump 292 and each of first clutch assembly 192 and second clutch assembly 202. In embodiment, pump 292 is an electric pump electrically coupled to a battery (not shown; e.g., battery 112) and a controller (not shown; e.g., controller 110). In embodiments, pump 292 is a mechanical pump operably coupled to axle assembly 180. In embodiments, pump 292 is operably coupled to at least one of electric motor 182, first intermediate shaft assembly 188, second intermediate shaft assembly 198, and output assembly 228. In embodiments, first cooling load 294 is one or more of bearings, bushings, gears, chains, or other components within axle assembly 180. Cooling system 291 also includes a plurality of conduits 298 fluidly coupling each of pump 292, cooling load 294, valve 296, and clutch assemblies 192, 202. In embodiments, valve 296 is operably coupled to a controller (not shown; e.g., controller 110 (FIG. 11)) and may selectively permit cooling flow to either of, both of, or neither of clutch assemblies 192, 202. That is, in embodiments, valve 296 is configured to provide cooling to each of clutch assemblies 192, 202. In embodiments, valve 296 is configured to provide cooling to only clutch assembly 192. In embodiments, valve 296 is configured to provide cooling to only clutch assembly 202. In embodiments, valve 296 is configured to provide cooling to neither of clutch assemblies 192, 202. A fluid (e.g., water, air, oil, antifreeze, or other fluid substance) is configured to fill conduits 298 and flow across cooling load 294 and clutch assemblies 192, 202. In embodiments, cooling system 291 includes a heat exchanger (not shown; e.g., radiator) to cool the fluids temperature and increase the cooling capacity of the fluid.

In embodiments, alternative axle assembly 180 is completely positioned within a housing which may be similar to housing 4. In embodiments, a controller (similar to controller 110) is configured to provide instructions to the electric motor (e.g., motor 120) to control one or more of a speed, torque, voltage, and/or current of the electric motor.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A driveline assembly, comprising:
a power source operably coupled to a first power source output and a second power source output;
a first intermediate shaft assembly operably coupled to the first power source output, the first intermediate shaft assembly comprising:
a first shaft;
a first output gear; and
a first clutch operably coupled to the first shaft, the first clutch operable between a disengaged position wherein the power source is operably decoupled from the first output gear and an engaged position wherein the power source is operably coupled to the first output gear;

a second intermediate shaft assembly operably coupled to the second power source output, the second intermediate shaft assembly comprising:
  a second shaft;
  a second output gear; and
  a second clutch operably coupled to the second shaft, the second clutch operable between a disengaged position wherein the power source is operably decoupled from the second output gear and an engaged position wherein the power source is operably coupled to the second output gear;
an output assembly selectively coupled with one of the first intermediate shaft assembly and the second intermediate shaft assembly; and
a hydraulic assembly comprising:
  a pump;
  a first valve operably coupled to the first clutch, the first valve operable to actuate a first piston to alter the first clutch between the disengaged and engaged position;
  a second valve operably coupled to the second clutch, the second valve operable to actuate a second piston to alter the second clutch between the disengaged and engaged position;
  a third valve operably coupled to a first synchronizer;
  a fourth valve operably coupled to a second synchronizer; and
  an accumulator fluidly coupled to the pump, the first valve, the second valve, the third valve, and the fourth valve.

2. The driveline assembly of claim 1, wherein the first synchronizer is coupled to the first intermediate shaft assembly and the second synchronizer is coupled to the second intermediate shaft assembly.

3. The driveline assembly of claim 2, further comprising:
  a fifth valve operably coupled to the first synchronizer;
  a sixth valve operably coupled to the second synchronizer; and
  the accumulator fluidly coupled to the pump, the first valve, the second valve, the third valve, the fourth valve, the fifth valve, and the sixth valve.

4. The driveline assembly of claim 3, wherein the first intermediate shaft assembly includes the first output gear and a third output gear, and the third valve is operable to couple the first synchronizer with the first output gear and the fifth valve is operable to couple the first synchronizer with the third output gear, and the second intermediate shaft assembly includes the second output gear and a fourth output gear, and the fourth valve is operable to couple the second synchronizer with the second output gear and the sixth valve is operable to couple the second synchronizer with the fourth output gear.

5. The driveline assembly of claim 3, wherein the accumulator is operable to maintain a pressure at each of the first valve, second valve, third valve, fourth valve, fifth valve, and sixth valve.

6. The driveline assembly of claim 1, further comprising:
  a cooling assembly comprising a pump and a cooling assembly valve selectively fluidly coupled to each of the first clutch and the second clutch;
  a controller operably coupled to the cooling assembly valve; and
  wherein the controller is operable to selectively control cooling fluid flowing to each of the first clutch and the second clutch.

7. The driveline assembly of claim 6, wherein the cooling assembly is fluidly coupled to a cooling load separate from the first clutch and the second clutch.

8. The driveline assembly of claim 7, wherein the cooling load is at least one of a bearing, bushing, gear, and chain.

9. The driveline assembly of claim 1, wherein the output assembly comprising a geartrain and an output member.

10. The driveline assembly of claim 9, wherein the geartrain of the output member comprises a planetary gearset selectively coupled with one of the first shaft of the first intermediate shaft assembly and the second shaft of the second intermediate shaft assembly.

11. The driveline assembly of claim 9, wherein the output member is a differential having an outer casing, a plurality of input pinion gears and a plurality of output gears.

12. The driveline assembly of claim 1, wherein at least a portion of first intermediate shaft assembly is vertically above the second intermediate shaft assembly.

13. The driveline assembly of claim 1, wherein a first meshed connection is formed when the output assembly is coupled with the first intermediate shaft assembly.

14. The driveline assembly of claim 13, wherein a second meshed connection is formed when the output assembly is coupled with the second intermediate shaft assembly.

15. The driveline assembly of claim 14, wherein the first meshed connection includes a first gear ratio, the second meshed connection includes a second gear ratio, the first meshed connection also includes a third gear ratio, and the second meshed connection also includes a fourth gear ratio.

16. The driveline assembly of claim 15, wherein the first gear ratio is less than the second gear ratio which is less than the third gear ratio which is less than the fourth gear ratio.

17. The driveline assembly of claim 1, wherein the power source is an electric motor.

18. The driveline assembly of claim 17, further comprising a controller configured to provide instructions to the electric motor.

* * * * *